(12) United States Patent
Shin et al.

(10) Patent No.: US 10,054,766 B2
(45) Date of Patent: Aug. 21, 2018

(54) PHOTOGRAPHING LENS SYSTEM AND PHOTOGRAPHING APPARATUS HAVING THE SAME

(71) Applicant: Samsung Electronics Co., Ltd., Gyeonggi-do (KR)

(72) Inventors: Hyun-jun Shin, Gyeonggi-do (KR); Han-eung Kim, Gyeonggi-do (KR); Jeong-kil Shin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/059,698

(22) Filed: Mar. 3, 2016

(65) Prior Publication Data

US 2016/0259150 A1    Sep. 8, 2016

(30) Foreign Application Priority Data

Mar. 6, 2015    (KR) .................. 10-2015-0031965

(51) Int. Cl.
  *G02B 3/02*     (2006.01)
  *G02B 13/18*    (2006.01)
  *G02B 13/00*    (2006.01)
  *G02B 27/00*    (2006.01)
  *G02B 9/62*     (2006.01)
  *G02B 13/16*    (2006.01)
  (Continued)

(52) U.S. Cl.
  CPC ........... *G02B 13/0045* (2013.01); *G02B 9/62* (2013.01); *G02B 27/0025* (2013.01); *G02B 3/04* (2013.01); *G02B 5/005* (2013.01); *G02B 13/16* (2013.01); *G02B 13/18* (2013.01)

(58) Field of Classification Search
  CPC ........ G02B 9/62; G02B 9/64; G02B 13/0045; G02B 13/18; G02B 15/177; G02B 27/0025
  USPC .................................................. 359/642–830
  See application file for complete search history.

(56) References Cited

U.S. PATENT DOCUMENTS

| 8,331,042 B2 | 12/2012 | Mori et al. |
| 8,441,746 B2 | 5/2013 | Hsieh et al. |
| 8,687,292 B2 | 4/2014 | Tsai et al. |

(Continued)

FOREIGN PATENT DOCUMENTS

| JP | 5496809 B2 | 3/2014 |
| TW | 201418764 A | 5/2014 |
| WO | 2014013677 A1 | 1/2014 |

OTHER PUBLICATIONS

European Search Report, dated Nov. 15, 2016.
European Search Report dated Jul. 27, 2016.
European Search Report dated May 3, 2018.

*Primary Examiner* — Mahidere Sahle
(74) *Attorney, Agent, or Firm* — Cha & Reiter, LLC.

(57) ABSTRACT

A photographing lens system and a photographing apparatus including the photographing lens system are provided. The photographing lens system may include a first lens having a negative refractive power, a second lens having a positive refractive power, a third lens having a negative refractive power, a fourth lens having a negative or positive refractive power, a fifth lens having a negative refractive power, and a sixth lens having a negative or positive refractive power. The first to sixth lenses may be sequentially arranged in a direction from an object side to an image side.

20 Claims, 17 Drawing Sheets

(51) Int. Cl.
  *G02B 3/04* (2006.01)
  *G02B 5/00* (2006.01)

(56) References Cited

U.S. PATENT DOCUMENTS

| | | |
|---|---|---|
| 8,711,492 B2 | 4/2014 | Huang |
| 8,743,477 B2 | 6/2014 | Tsai et al. |
| 8,743,483 B2 | 6/2014 | Hsu et al. |
| 2012/0026608 A1 | 2/2012 | Mori et al. |
| 2014/0029115 A1 | 1/2014 | Liao et al. |
| 2014/0184882 A1* | 7/2014 | Kuzuhara ............ G02B 15/177 348/345 |
| 2015/0124333 A1 | 5/2015 | Noda et al. |
| 2015/0212296 A1 | 7/2015 | Huang et al. |

* cited by examiner

PHOTOGRAPHING LENS SYSTEM AND PHOTOGRAPHING APPARATUS HAVING THE SAME

CLAIM OF PRIORITY

The present application claims the benefit of Korean Patent Application No. 10-2015-0031965, filed on Mar. 6, 2015, in the Korean Intellectual Property Office, the disclosure of which is incorporated herein in its entirety by reference.

BACKGROUND

1. Technical Field

The present disclosure generally relates to a small photographing lens system and a photographing apparatus including the photographing lens system.

2. Description of the Related Art

Cameras of devices, such as portable terminals, have been developed to provide multiple functions and services such as general photographing, videoing, and video calling.

In addition, image sensors having smaller pixels have been developed to realize high-performance, high-quality photographing apparatuses.

Small, high-resolution, and high-performance photographing lenses facilitate reducing the size of photographing apparatuses. However, it is difficult to realize high functionality and performance by using few photographing lenses, e.g., only four or five photographing lenses. If more lenses are included in a photographing lens system, the optical performance of the photographing lens system may be improved. However, it is difficult to reduce the size of the photographing lens system while at the same time increasing the number of photographing lenses included in the system. Thus, it is difficult to provide slim photographing lenses while improving the optical characteristics, such as aberration characteristics, of the photographing lenses.

SUMMARY

Disclosed herein is a small, high-performance photographing lens system.

Also disclosed herein is a photographing apparatus including a small, high-performance photographing lens system.

According to an aspect of an embodiment, a photographing lens system may include: a first lens having a negative refractive power; a second lens including an object-side surface convex toward an object side, the second lens having a positive refractive power; a third lens including an image-side surface concave toward an image side, the third lens having a negative refractive power; a fourth lens having a negative or positive refractive power; a fifth lens having a negative refractive power; and a sixth lens including an image-side surface concave toward the image side, the sixth lens having a negative or positive refractive power, wherein the first to sixth lenses are sequentially arranged in a direction from the object side to the image side.

The photographing lens system may satisfy the following expression:

$0.65 < TTL/DI < 0.8$,  <Expression> where TTL refers to a distance from an object-side surface of the first lens to an image sensor, and DI refers to a diagonal length of the image sensor.

The photographing lens system may satisfy the following expression:

$70° < FOV < 80°$,  <Expression> where FOV refers to a field of view.

The photographing lens system may satisfy the following expression:

$1.2 < TTL/CT < 1.8$,  <Expression> where TTL refers to a distance from an object-side surface of the first lens to an image sensor, and CT refers to a sum of center thicknesses of the first to sixth lenses measured along an optical axis.

The photographing lens system may satisfy the following expression:

$1.4 < f/f2 < 1.8$,  <Expression> where f denotes a focal length of the photographing lens system, and f2 denotes a focal length of the second lens.

The photographing lens system may satisfy the following expressions:

$Vd3 < 30$;

$Vd4 < 30$,  <Expressions> where Vd3 refers to an Abbe number of the third lens, and Vd4 refers to an Abbe number of the fourth lens.

The photographing lens system may further include at least one aperture stop disposed between an object-side surface of the first lens and the third lens.

Each of the first to sixth lenses may include at least one aspheric surface.

Each of the first to sixth lenses may include a plastic lens.

The image-side surface of the sixth lens may have at least one inflection point.

The first lens may have a meniscus shape convex toward the object side.

According to an aspect of another embodiment, a photographing lens system may include: a first lens having a negative refractive power; a second lens having a positive refractive power; a third lens having a negative refractive power; a fourth lens having a negative or positive refractive power; a fifth lens having a negative refractive power; and a sixth lens having a negative or positive refractive power, wherein the first to sixth lenses are sequentially arranged in a direction from an object side to an image side, and the photographing lens system satisfies the following expression:

$1.4 < f/f2 < 1.8$,  <Expression> where f denotes a focal length of the photographing lens system, and f2 denotes a focal length of the second lens.

According to an aspect of another embodiment, a photographing apparatus may include: a photographing lens system; and an image sensor configured to receive an image formed by the photographing lens system and convert the image into an electric image signal, wherein the photographing lens system includes: a first lens having a negative refractive power; a second lens including an object-side surface convex toward an object side, the second lens having a positive refractive power; a third lens including an image-side surface concave toward an image side, the third lens having a negative refractive power; a fourth lens having a negative or positive refractive power; a fifth lens having a negative refractive power; and a sixth lens including an image-side surface concave toward the image side, the sixth lens having a negative or positive refractive power, wherein the first to sixth lenses are sequentially arranged in a direction from the object side to the image side.

These and other aspects of the present disclosure will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Figure 1:
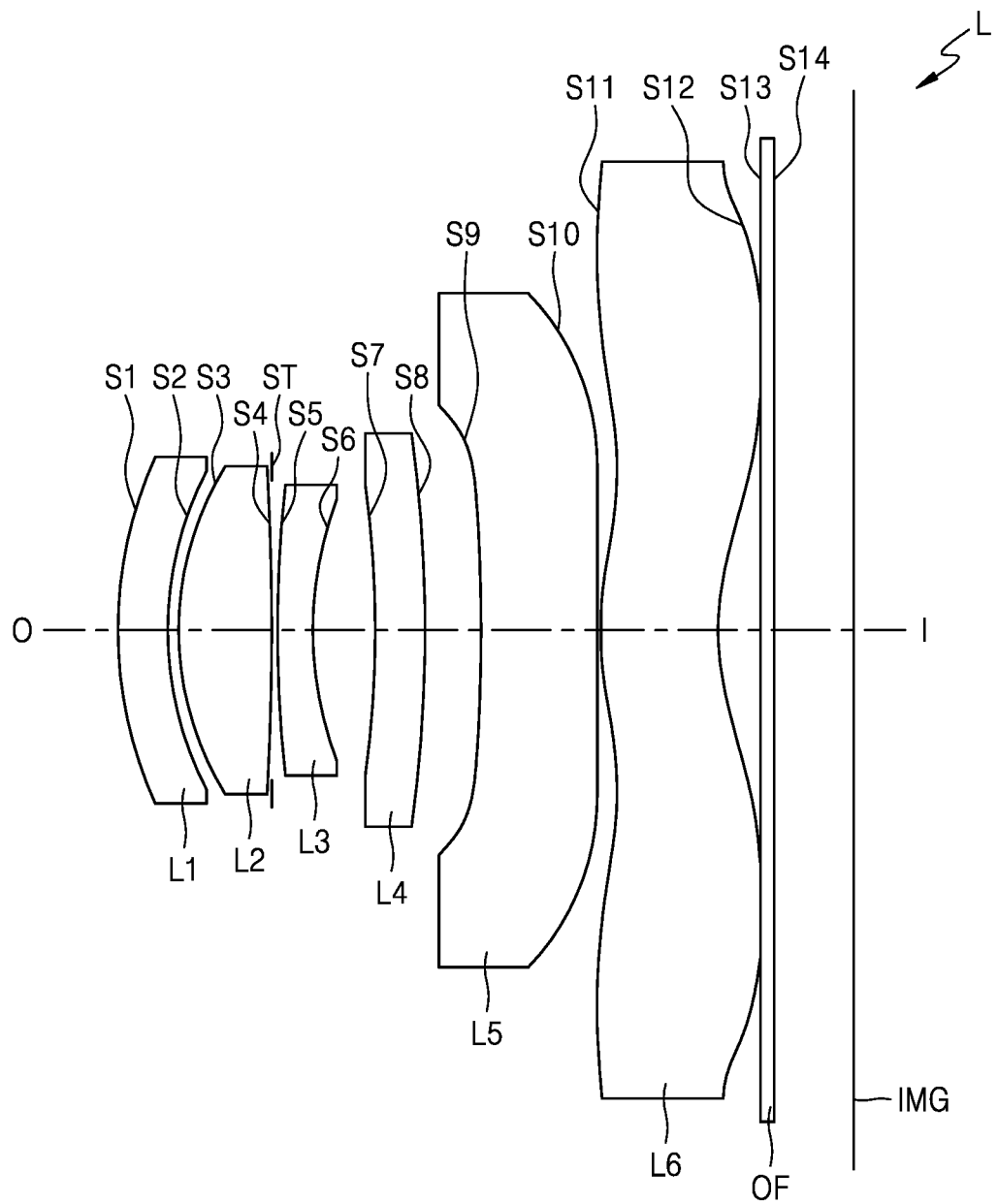
FIG. 1 illustrates a photographing lens system according to a first numerical embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed. Expressions such as "at least one of," when preceding a list of elements, modify the entire list of elements and do not modify the individual elements of the list.

Photographing lens systems and photographing apparatuses including the photographing lens systems will now be described according to embodiments with reference to the accompanying drawings.

FIG. 1 illustrates a photographing lens system L according to an embodiment of the present disclosure.

The photographing lens system L may include a first lens L1 having a negative refractive power, a second lens L2 having a positive refractive power, a third lens L3 having a negative refractive power, a fourth lens L4 having a negative or positive refractive power, a fifth lens L5 having a negative refractive power, and a sixth lens L6 having a negative or positive refractive power. The first to sixth lenses L1 to L6 may be sequentially arranged in a direction from an object side O to an image side I.

In the following description, the term "image side" may refer to a side of an image plane IMG on which an image will be formed, and the term "object side" may refer to a side of an object to be photographed. For example, the image plane IMG may be a surface of an imaging device or an image sensor. For example, the image sensor may include a complementary metal oxide semiconductor (CMOS) or a charge coupled device (CCD). In the following description, an object-side surface of a lens refers to a surface facing an object to be photographed, and an image-side surface of a lens refers to a surface facing an image plane.

For example, the first lens L1 may have an object-side surface convex toward the object side O. For example, the first lens L1 may have a meniscus shape that is convex toward the object side O. The second lens L2 may have an object-side surface that is convex toward the object side O. For example, the second lens L2 may be a biconvex lens.

The second lens L3 may have an image-side surface that is concave toward the image side I. For example, the third lens L3 may be a biconcave lens or a meniscus lens. The second lens L4 may have an image-side surface convex toward the image side I. For example, the fourth lens L4 may be a meniscus lens. The fifth lens L5 may have an object-side surface concave or convex toward the object side O. For example, at least one of the object-side surface and an image-side surface of the fifth lens L5 may have at least one inflection point. Herein, the term "inflection point" may refer to a point at which the sign of the radius of curvature of a lens surface changes from positive (+) to negative (−), or from negative (−) to positive (+). In addition, the term "reflection point" may refer to a point at which the shape of a lens surface changes from convex to concave, or from concave to convex. For example, the image-side surface of the fifth lens L5 may be concave or convex toward the image side I in a region around an optical axis of the photographing lens system L (in a region located around the optical axis within a predetermined radius).

The sixth lens L6 may have an image-side surface that is concave toward the image side I. For example, at least one of an object-side surface and the image-side surface of the sixth lens L6 may have at least one inflection point. For example, in a region around the optical axis, the object-side surface of the sixth lens L6 may be convex toward the object side O, and the image-side surface of the sixth lens L6 may be concave toward the image side I.

An object image may pass through the first lens L1, the second lens L2, the third lens L3, the fourth lens L4, the fifth lens L5, and the sixth lens L6, and may then be incident on the image plane IMG. At least one optical filter OF may be disposed between the sixth lens L6 and the image plane IMG.

The optical filter OF may include at least one of low-pass filters, infrared (IR)-cut filters, and cover glass. For example, if the optical filter OF includes an IR-cut filter, visible light rays may pass through the optical filter OF but infrared rays may not pass through the optical filter OF. Thus, infrared rays may not reach the image plane IMG. However, the photographing lens system L may include no optical filter.

In addition, the photographing lens system L may include at least one aperture stop ST. For example, the aperture stop ST may be disposed at at least one position between the object-side surface of the first lens L1 and the third lens L3. For example, the aperture stop ST may be disposed between the second lens L2 and the third lens L3.

Each of the first to sixth lenses L1 to L6 may has at least one aspheric surface. For example, each of the first to sixth lenses L1 to L6 may be a double aspheric lens. In this case, the photographing lens system L may have compact and high-resolution characteristics. In addition, at least one of the first to sixth lenses L1 to L6 may include a plastic, glass material or the like. In this case, the manufacturing costs of the photographing lens system L may be decreased, and aspheric surfaces may be easily formed, for example, on a plastic material. For example, each of the first to sixth lenses L1 to L6 may be a plastic lens.

In the embodiment, the photographing lens system L may satisfy Expression 1 below:

0.65<TTL/DI<0.8                    <Expression 1>

In Expression 1, TTL refers to a distance from the object-side surface of the first lens L1 to the image sensor, and DI refers to a diagonal length of the image sensor. Expression 1 regulates the size of the photographing lens system L, and if the photographing lens system L satisfies Expression 1, the photographing lens system L may have a small size and slim shape.

For example, the photographing lens system L may satisfy the expression, 0.7<TTL/DI<0.8.

In the embodiment, the photographing lens system L may satisfy Expression 2 below:

70°<FOV<80°                    <Expression 2>

In Expression 2, FOV refers to a field of view.

In the embodiment, the photographing lens system L may satisfy Expression 3 below:

1.2<TTL/CT<1.8                    <Expression 3>

In Expression 3, TTL refers to a distance from the object-side surface of the first lens L1 to the image sensor, and CT refers to the sum of center thicknesses of the first to sixth lenses L1 to L6 measured along the optical axis of the photographing lens system L. If the photographing lens system L satisfies Expression 3, the photographing lens system L may have optimized lens distances and thicknesses and thus may have a slim shape.

In the embodiment, the photographing lens system L may satisfy Expression 4 below:

1.4<f/f2<1.8                    <Expression 4>

In Expression 4, f denotes the focal length of the photographing lens system L, and f2 denotes the focal length of the second lens L2. If f/f2 satisfies Expression 4, the second lens L2 disposed behind the first lens L1 having a negative refractive power may have a relatively strong positive refractive power, and thus spherical aberration may easily be corrected by reciprocal compensation.

In the embodiment, the photographing lens system L may satisfy Expressions 5 and 6 below:

Vd3<30                    <Expression 5>

Vd4<30                    <Expression 6>

In Expressions 5 and 6, Vd3 refers to the Abbe number of the third lens L3, and Vd4 refers to the Abbe number of the fourth lens L4. If the third and fourth lenses L3 and L4 respectively satisfy Expressions 5 and 6, chromatic aberration may easily be corrected.

In the descriptions of photographing lens systems according to embodiments, the term "aspheric" or "aspheric surface" has the following definition.

In particular, when an optical axis is set as an x-axis, a direction perpendicular to the optical axis is set as a y-axis, and the propagation direction of rays is denoted as a positive direction, an aspheric surface of a lens may be defined by Expression 7. In Expression 7, x denotes a distance measured from the vertex of a lens in the direction of the optical axis of the lens, y denotes a distance measured from the optical axis in a direction perpendicular to the optical axis, K denotes a conic constant, A, B, C, D, . . . denote aspheric coefficients, and c denotes the reciprocal (1/R) of the radius of curvature at the vertex of the lens.

$$x = \frac{cy^2}{1 + \sqrt{1 - (K+1)c^2 y^2}} + Ay^4 + By^6 + Cy^8 + Dy^{10} + \ldots$$      <Expression 7>

Variously designed photographing lens systems may be provided according to numerical embodiments as described below.

In the following numerical embodiments, lens surfaces are sequentially numbered with S1, S2, S3, . . . Sn in a direction from an object side O to an image side I. In addition, ST refers to an aperture stop, and * refers to an aspherical surface. The reference wavelength for refractive indexes is 587.6 nm.

First Numerical Embodiment

FIG. 1 illustrates the photographing lens system L according to a first numerical embodiment, and design data for the photographing lens system L of the first numerical embodiment are as follows.

In the first numerical embodiment, an effective focal length is 4.45 mm, the focal length f1 of the first lens L1 is −373.32 mm, the focal length f2 of the second lens L2 is 2.85 mm, the focal length f3 of the third lens L3 is −6.186 mm, the focal length f4 of the fourth lens L4 is 44.836 mm, the focal length f5 of the fifth lens L5 is −200.734 mm, and the focal length f6 of the sixth lens L6 is −11.51 mm.

TABLE 1

| Surfaces | Radius of curvature | Lens distance or thickness | Refractive index | Abbe number |
|---|---|---|---|---|
| S1 | −2.077 | 0.370 | 1.544 | 56 |
| S2 | −1.927 | 0.076 | | |
| S3 | −1.628 | 0.686 | 1.544 | 56 |
| S4 | 27.883 | 0.031 | | |
| S5 | 10.476 | 0.268 | 1.65 | 21.5 |
| S6 | 2.877 | 0.418 | | |
| S7 | −90.199 | 0.381 | 1.65 | 21.5 |
| S8 | −22.073 | 0.416 | | |
| S9 | −18.941 | 0.843 | 1.535 | 56 |
| S10 | −23.356 | 0.053 | | |
| S11 | 2.668 | 0.852 | 1.535 | 56 |
| S12 | 1.654 | 0.302 | | |
| S13 | Infinity | 0.110 | 1.517 | 64.1 |
| S14 | Infinity | 0.557 | | |
| IMG | Infinity | 0.000 | | |

Table 2 below shows aspheric coefficients in the first numerical embodiment.

TABLE 2

| Coefficients | S1 | S2 | S3 | S4 | S5 | S6 |
|---|---|---|---|---|---|---|
| K | −0.02999 | −6.31857 | −2.19124 | −171.02738 | 51.18328 | −14.46409 |
| A | 0.01332 | −0.10382 | −0.08813 | −0.10276 | −0.16095 | 0.02912 |
| B | −0.08303 | 0.03781 | 0.09722 | 0.40824 | 0.49508 | 0.08060 |
| C | 0.12675 | −0.08587 | −0.14958 | −0.94760 | −1.10425 | −0.10643 |
| D | −0.12503 | 0.27420 | 0.43651 | 1.34670 | 1.54927 | 0.03123 |
| E | 0.07416 | −0.37205 | −0.61396 | −1.22983 | −1.45850 | 0.07270 |

| Coefficients | S7 | S8 | S9 | S10 | S11 | S12 |
|---|---|---|---|---|---|---|
| K | 6.31667 | 13.39985 | 2.36181 | 28.78853 | −5.22979 | −4.42785 |
| A | −0.05912 | −0.03220 | 0.04145 | 0.00562 | −0.13146 | −0.06760 |
| B | −0.03169 | −0.04499 | −0.09451 | −0.01923 | 0.06798 | 0.02706 |
| C | 0.15089 | 0.11631 | 0.05856 | 0.00181 | −0.02843 | −0.00829 |
| D | −0.21302 | −0.12135 | −0.02289 | 0.00230 | 0.00777 | 0.00168 |
| E | 0.15360 | 0.08302 | 0.00500 | −0.00106 | −0.00120 | −0.00022 |

In the first numerical embodiment described above, values of Expressions 1 to 6 are as follows:

TTL/DI=0.79;

FOV=73.9°;

TTL/CT=1.58;

$f/f2$=1.561;

$Vd3$=21.5; and $Vd4$=21.5

Figure 2:
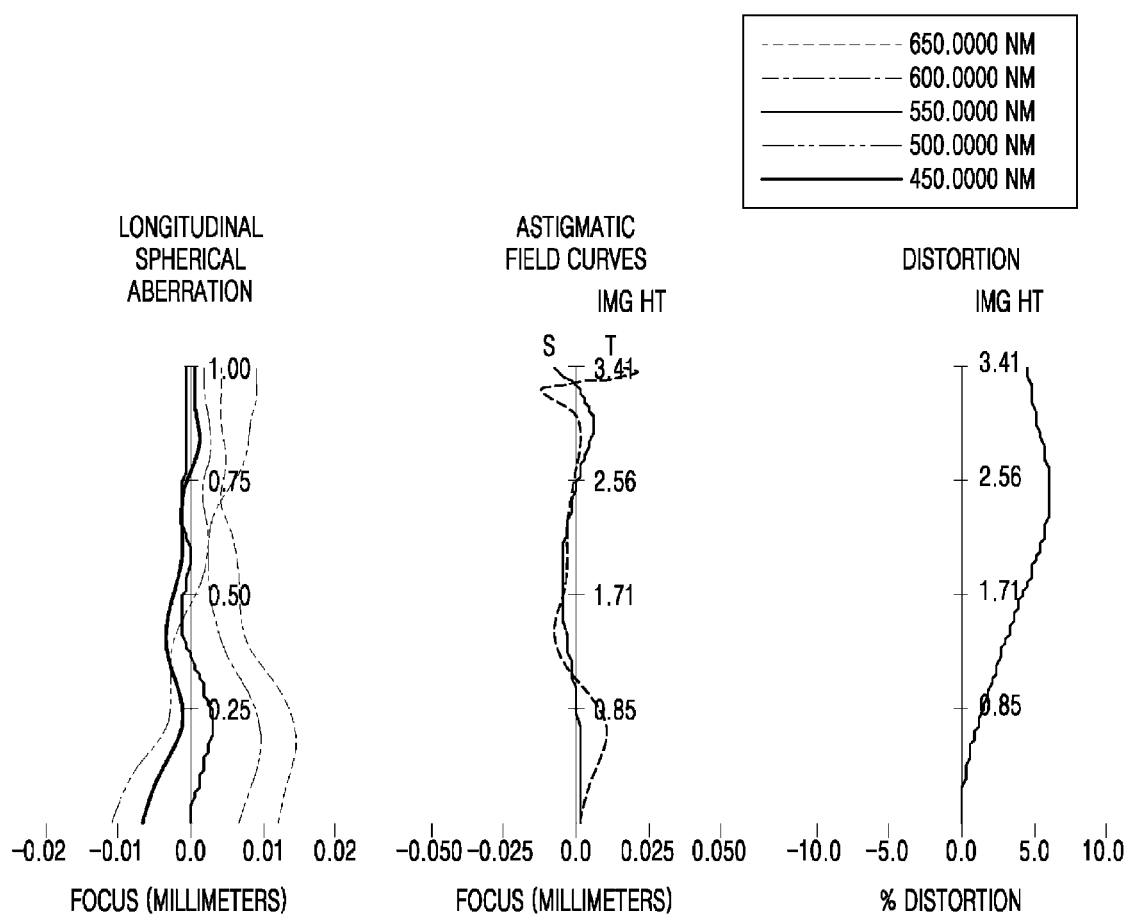
FIG. 2 illustrates aberrations of the photographing lens system according to the first numerical embodiment.

FIG. 2 illustrates longitudinal spherical aberration, astigmatic field curves, and distortion of the photographing lens system L according to the first numerical embodiment. The astigmatic field curves include a tangential field curvature T and a sagittal field curvature S.

Second Numerical Embodiment

Figure 3:
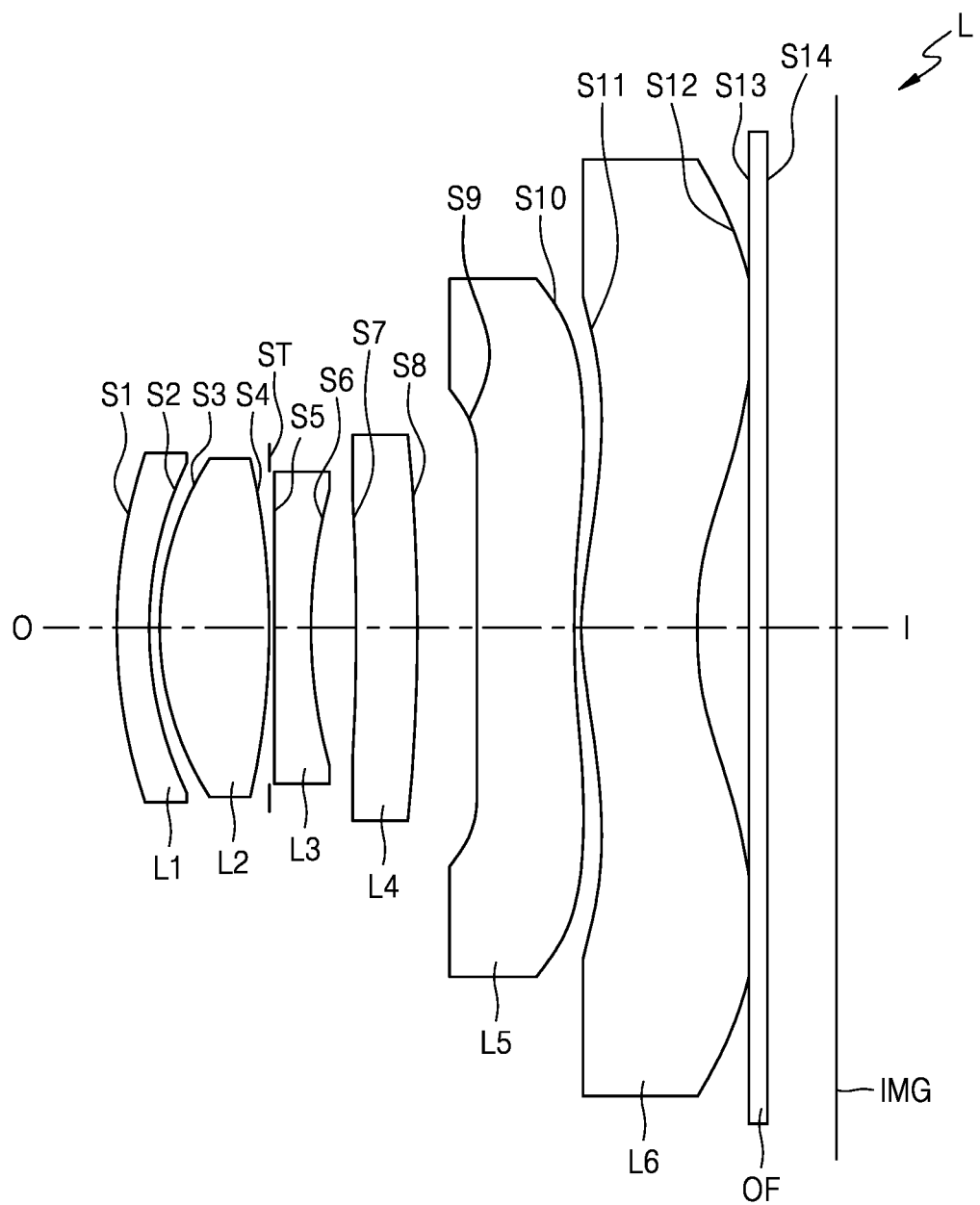
FIG. 3 illustrates a photographing lens system according to a second numerical embodiment.

FIG. 3 illustrates a photographing lens system L according to a second numerical embodiment, and design data for the photographing lens system L of the second numerical embodiment are as follows.

In the second numerical embodiment, an effective focal length is 4.04 mm, the focal length f1 of a first lens L1 is −11.04 mm, the focal length f2 of a second lens L2 is 2.322 mm, the focal length f3 of a third lens L3 is −6.645 mm, the focal length f4 of a fourth lens L4 is 86.323 mm, the focal length f5 of a fifth lens L5 is −200.77 mm, and the focal length f6 of a sixth lens L6 is −31.051 mm.

TABLE 3

| Surfaces | Radius of curvature | Lens distance or thickness | Refractive index | Abbe number |
|---|---|---|---|---|
| S1 | −2.647 | 0.231 | 1.544 | 56 |
| S2 | −1.781 | 0.061 | | |
| S3 | −1.462 | 0.838 | 1.544 | 56 |
| S4 | 7.419 | 0.030 | | |
| S5 | −65.647 | 0.268 | 1.65 | 21.5 |
| S6 | 4.634 | 0.354 | | |
| S7 | −23.791 | 0.424 | 1.65 | 21.5 |
| S8 | −16.827 | 0.445 | | |
| S9 | −117.315 | 0.720 | 1.535 | 56 |
| S10 | 1269.461 | 0.068 | | |
| S11 | 2.097 | 0.841 | 1.535 | 56 |
| S12 | 1.602 | 0.381 | | |
| S13 | Infinity | 0.110 | 1.517 | 64.1 |
| S14 | Infinity | 0.512 | | |
| IMG | Infinity | 0.004 | | |

Table 4 below shows aspheric coefficients in the second numerical embodiment.

TABLE 4

| Coefficients | S1 | S2 | S3 | S4 | S5 | S6 | S7 | S8 | S9 | S10 | S11 | S12 |
|---|---|---|---|---|---|---|---|---|---|---|---|---|
| K | −1.52423 | −1.39149 | −0.23061 | 0.00000 | 99.99900 | −49.86308 | 0.00000 | 0.00000 | 0.00000 | 0.00000 | −4.44964 | −3.94302 |
| A | −0.02217 | −0.07919 | −0.08063 | −0.12629 | −0.12187 | 0.03710 | −0.05930 | −0.03820 | 0.07762 | 0.05020 | −0.11680 | −0.05826 |
| B | 0.01484 | 0.05034 | 0.05000 | 0.40345 | 0.49104 | 0.09063 | −0.00109 | −0.03600 | −0.12019 | −0.02933 | 0.06233 | 0.02377 |
| C | −0.05846 | −0.08769 | −0.15126 | −0.89852 | −1.02982 | −0.09525 | 0.12499 | 0.11231 | 0.05137 | 0.00299 | −0.02682 | −0.00759 |
| D | 0.11753 | 0.25646 | 0.41029 | 1.26062 | 1.43666 | 0.01451 | −0.17493 | −0.10876 | 0.01177 | 0.00205 | 0.00724 | 0.00157 |
| E | −0.12227 | −0.33753 | −0.55953 | −1.13273 | −1.33732 | 0.06100 | 0.12327 | 0.07054 | −0.02605 | −0.00098 | −0.00110 | −0.00020 |

In the second numerical embodiment described above, values of Expressions 1 to 6 are as follows:

TTL/DI<0.774;

FOV=77.7°;

TTL/CT=1.59;

f/f2=1.74;

Vd3=21.5; and

Vd4=25.9

Figure 4:
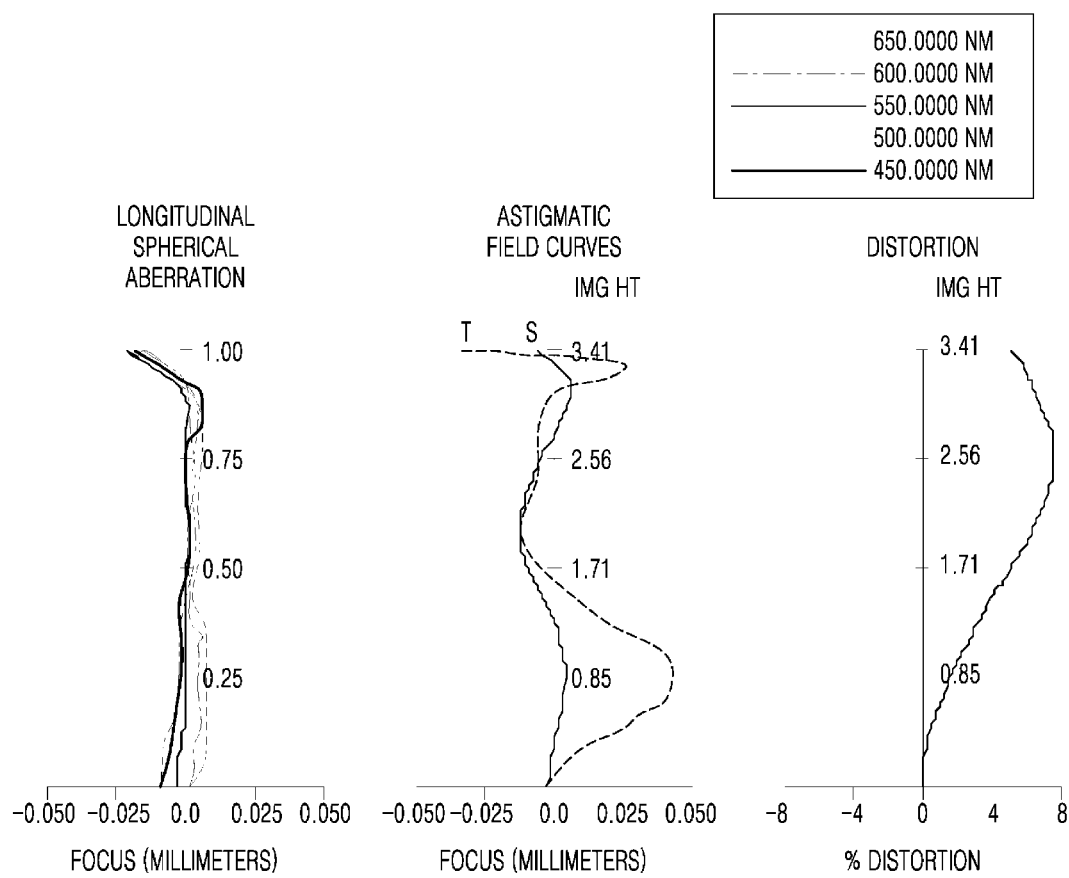
FIG. 4 illustrates aberrations of the photographing lens system according to the second numerical embodiment.

FIG. 4 illustrates longitudinal spherical aberration, astigmatic field curves, and distortion of the photographing lens system L according to the second numerical embodiment.

Third Numerical Embodiment

Figure 5:
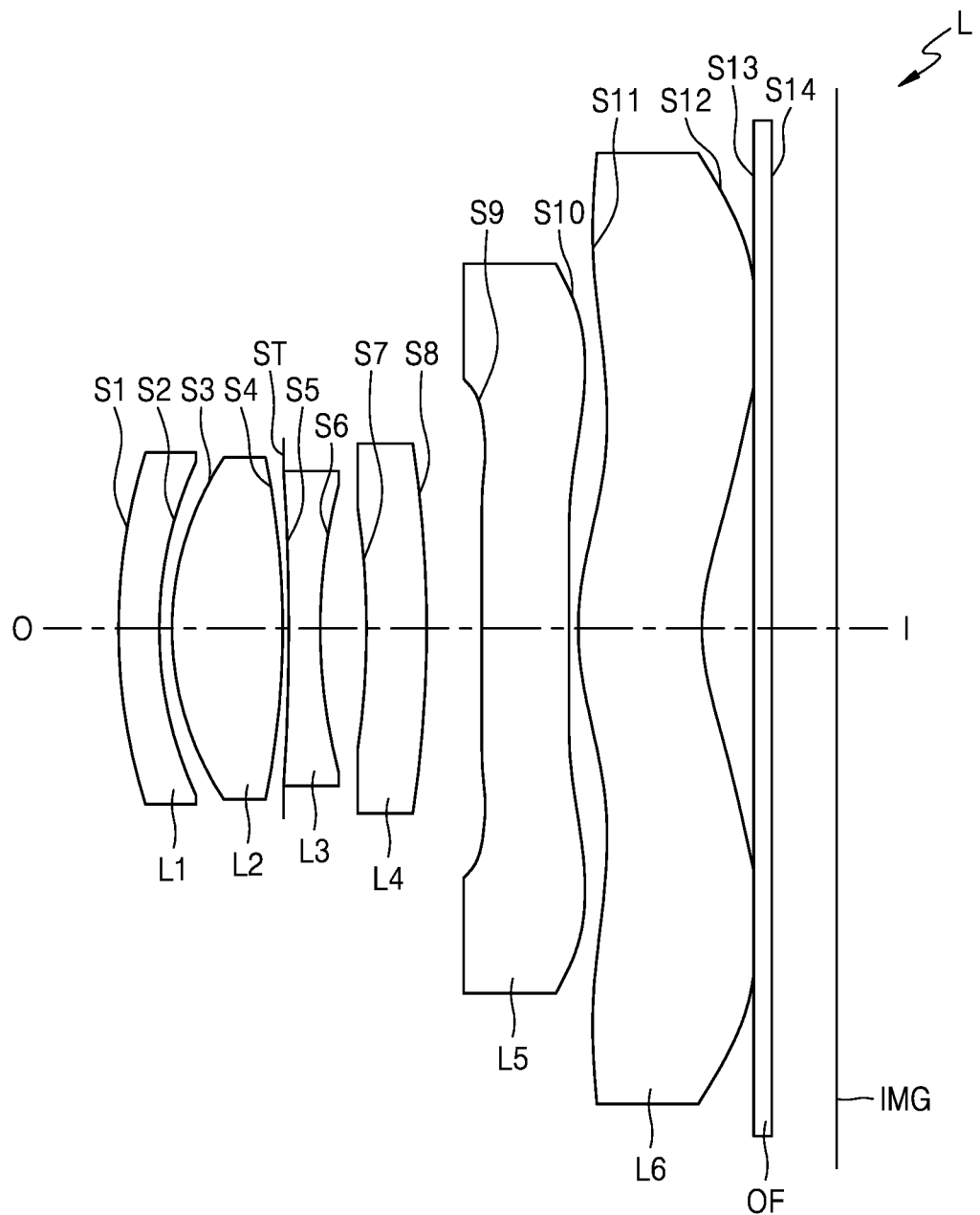
FIG. 5 illustrates a photographing lens system according to a third numerical embodiment.

FIG. 5 illustrates a photographing lens system L according to a third numerical embodiment, and design data for the photographing lens system L of the third numerical embodiment are as follows.

In the third numerical embodiment, an effective focal length is 3.941 mm, the focal length f1 of a first lens L1 is −11.615 mm, the focal length f2 of a second lens L2 is 2.29 mm, the focal length f3 of a third lens L3 is −6.438 mm, the focal length f4 of a fourth lens L4 is −137.226 mm, the focal length f5 of a fifth lens L5 is −188.25 mm, and the focal length f6 of a sixth lens L6 is −192.967 mm.

TABLE 5

| Surfaces | Radius of curvature | Lens distance or thickness | Refractive index | Abbe number |
|---|---|---|---|---|
| S1 | −2.571 | 0.300 | 1.544 | 56 |
| S2 | −1.752 | 0.100 | | |
| S3 | −1.441 | 0.802 | 1.544 | 56 |
| S4 | 7.396 | 0.031 | | |
| S5 | −34.586 | 0.260 | 1.65 | 21.5 |
| S6 | 4.778 | 0.332 | | |
| S7 | −8.139 | 0.423 | 1.65 | 21.5 |
| S8 | −9.139 | 0.409 | | |
| S9 | 18.352 | 0.644 | 1.535 | 56 |
| S10 | 15.333 | 0.092 | | |
| S11 | 1.899 | 0.917 | 1.535 | 56 |
| S12 | 1.550 | 0.381 | | |
| S13 | Infinity | 0.110 | 1.517 | 64.1 |
| S14 | Infinity | 0.502 | | |
| IMG | Infinity | 0.003 | | |

Table 6 below shows aspheric coefficients in the third numerical embodiment.

TABLE 6

| Constants | S1 | S2 | S3 | S4 | S5 | S6 | S7 | S8 | S9 | S10 | S11 | S12 |
|---|---|---|---|---|---|---|---|---|---|---|---|---|
| K | −1.31202 | −1.44849 | −0.23587 | 0.00000 | 99.87680 | −51.34598 | 0.00000 | 0.00000 | 0.00000 | 0.00000 | −3.69979 | −3.43380 |
| A | −0.02088 | −0.07987 | −0.08063 | −0.12572 | −0.12243 | 0.03635 | −0.06014 | −0.03877 | 0.08423 | 0.05090 | −0.11612 | −0.06080 |
| B | 0.01536 | 0.05084 | 0.04908 | 0.40399 | 0.49026 | 0.09116 | 0.00079 | −0.03808 | −0.11876 | −0.02898 | 0.06238 | 0.02375 |
| C | −0.05818 | −0.08759 | −0.15149 | −0.89836 | −1.03003 | −0.09423 | 0.12487 | 0.11316 | 0.05106 | 0.00301 | −0.02683 | −0.00758 |
| D | 0.11769 | 0.25638 | 0.41037 | 1.26061 | 1.43683 | 0.01516 | −0.17615 | −0.10847 | 0.01184 | 0.00205 | 0.00724 | 0.00157 |
| E | −0.12221 | −0.33759 | −0.55940 | −1.13276 | −1.33706 | 0.06126 | 0.12309 | 0.07054 | −0.02597 | −0.00098 | −0.00110 | −0.00020 |

In the third numerical embodiment described above, values of Expressions 1 to 6 are as follows:

TTL/DI<0.777;

FOV=78.95°;

TTL/CT=1.585;

f/f2=1.721;

Vd3=21.5; and

Vd4=25.9

Figure 6:
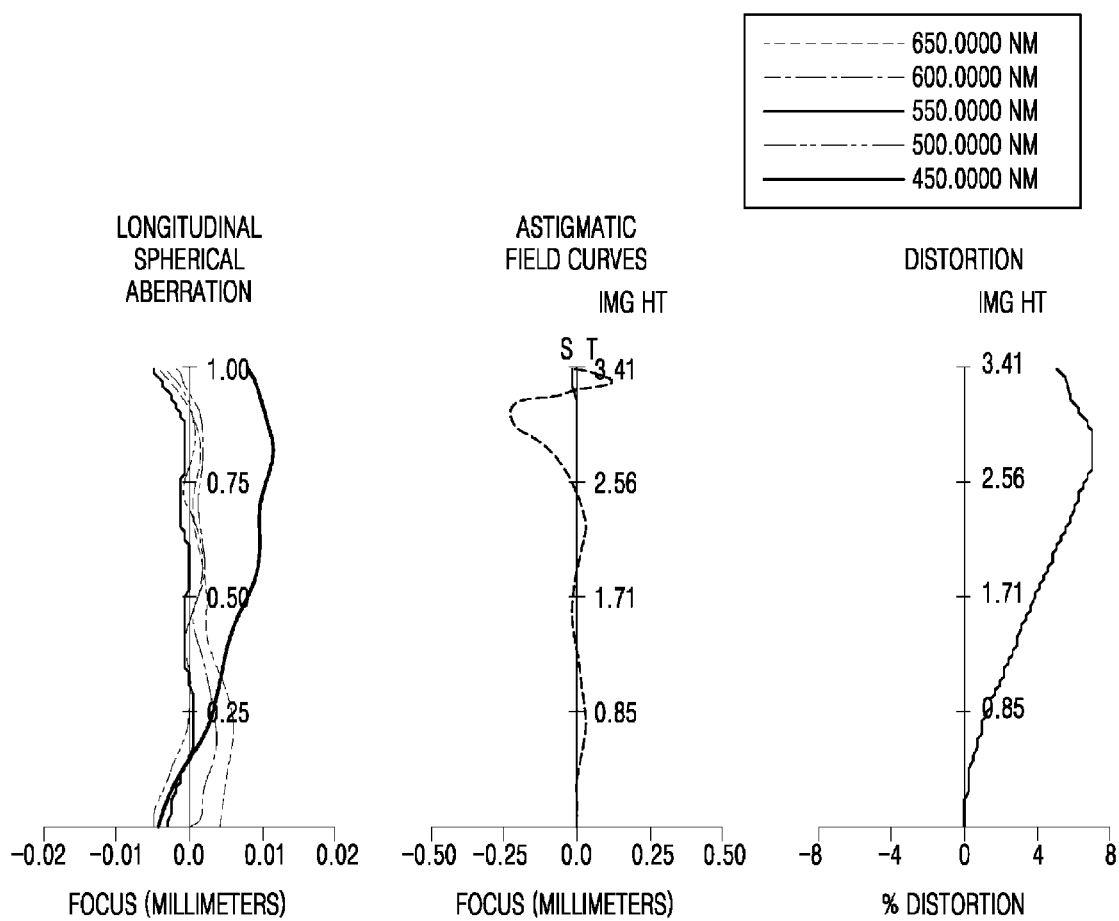
FIG. 6 illustrates aberrations of the photographing lens system according to the third numerical embodiment.

FIG. 6 illustrates longitudinal spherical aberration, astigmatic field curves, and distortion of the photographing lens system L according to the third numerical embodiment.

Fourth Numerical Embodiment

Figure 7:
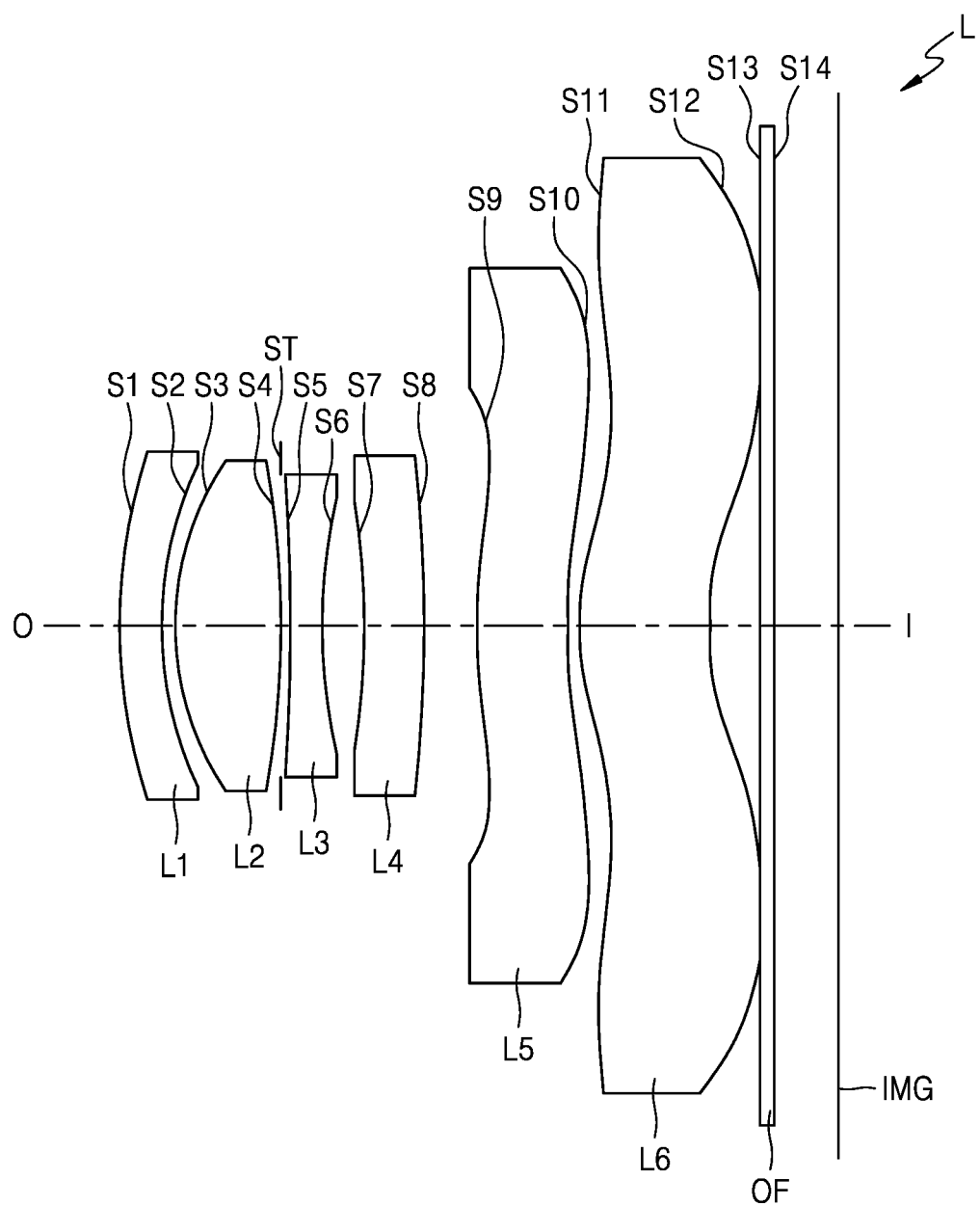
FIG. 7 illustrates a photographing lens system according to a fourth numerical embodiment.

FIG. 7 illustrates a photographing lens system L according to a fourth numerical embodiment, and design data for the photographing lens system L of the fourth numerical embodiment are as follows.

In the fourth numerical embodiment, an effective focal length is 3.947 mm, the focal length f1 of a first lens L1 is −11.651 mm, the focal length f2 of a second lens L2 is 2.294 mm, the focal length f3 of a third lens L3 is −6.53 mm, the focal length f4 of a fourth lens L4 is −74.494 mm, the focal length f5 of a fifth lens L5 is −200.675 mm, and the focal length f6 of a sixth lens L6 is −306.87 mm.

TABLE 7

| Surfaces | Radius of curvature | Lens distance or thickness | Refractive index | Abbe number |
|---|---|---|---|---|
| S1 | −2.572 | 0.300 | 1.544 | 56 |
| S2 | −1.755 | 0.100 | | |
| S3 | −1.437 | 0.800 | 1.544 | 56 |
| S4 | 7.651 | 0.031 | | |
| S5 | −37.842 | 0.260 | 1.65 | 21.5 |
| S6 | 4.797 | 0.309 | | |
| S7 | −10.291 | 0.449 | 1.65 | 21.5 |
| S8 | −13.291 | 0.415 | | |
| S9 | 17.817 | 0.669 | 1.535 | 56 |
| S10 | 15.080 | 0.071 | | |
| S11 | 1.874 | 0.926 | 1.535 | 56 |
| S12 | 1.533 | 0.381 | | |
| S13 | Infinity | 0.110 | 1.517 | 64.1 |
| S14 | Infinity | 0.494 | | |
| IMG | Infinity | 0.003 | | Image Plane |

Table 8 below shows aspheric coefficients in the fourth numerical embodiment.

TABLE 8

| Coefficients | S1 | S2 | S3 | S4 | S5 | S6 | S7 | S8 | S9 | S10 | S11 | S12 |
|---|---|---|---|---|---|---|---|---|---|---|---|---|
| K | −1.28594 | −1.45204 | −0.23663 | 0.00000 | 69.30567 | −52.78389 | 0.00000 | 0.00000 | 0.00000 | 0.00000 | −3.64936 | −3.49013 |
| A | −0.02070 | −0.07990 | −0.08072 | −0.12565 | −0.12235 | 0.03587 | −0.06029 | −0.03884 | 0.08355 | 0.05069 | −0.11609 | −0.06078 |

TABLE 8-continued

| Coefficients | S1 | S2 | S3 | S4 | S5 | S6 | S7 | S8 | S9 | S10 | S11 | S12 |
|---|---|---|---|---|---|---|---|---|---|---|---|---|
| B | 0.01547 | 0.05088 | 0.04897 | 0.40405 | 0.49022 | 0.09127 | 0.00098 | −0.03810 | −0.11935 | −0.02899 | 0.06239 | 0.02376 |
| C | −0.05815 | −0.08761 | −0.15149 | −0.89834 | −1.03001 | −0.09378 | 0.12471 | 0.11334 | 0.05122 | 0.00301 | −0.02683 | −0.00758 |
| D | 0.11770 | 0.25634 | 0.41041 | 1.26062 | 1.43689 | 0.01553 | −0.17645 | −0.10863 | 0.01193 | 0.00205 | 0.00724 | 0.00157 |
| E | −0.12221 | −0.33761 | −0.55937 | −1.13274 | −1.33701 | 0.06139 | 0.12299 | 0.07036 | −0.02595 | −0.00098 | −0.00110 | −0.00020 |

In the fourth numerical embodiment, values of Expressions 1 to 6 are as follows:

TTL/DI<0.778;

FOV=78.87°;

TTL/CT=1.562;

$f/f2$=1.72;

$Vd3$=21.5; and $Vd4$=25.9

Figure 8:
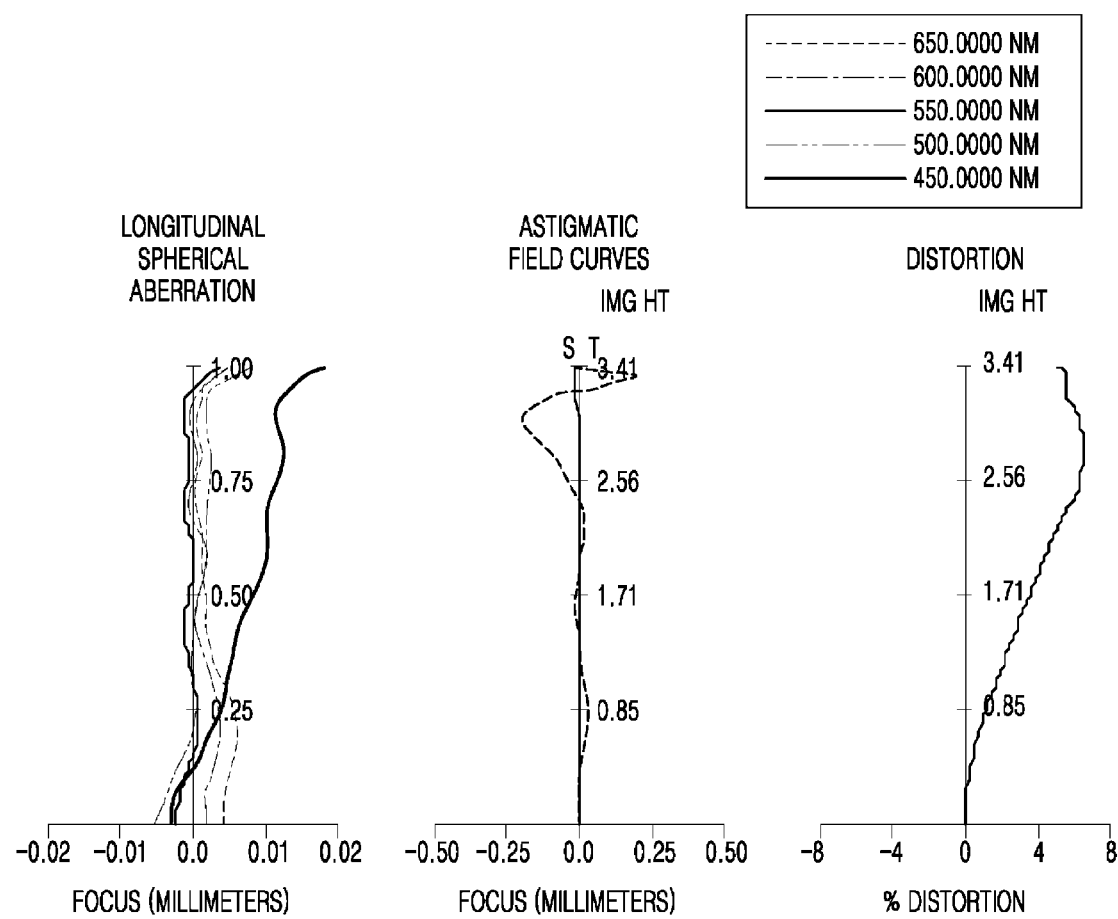
FIG. 8 illustrates aberrations of the photographing lens system according to the fourth numerical embodiment.

FIG. 8 illustrates longitudinal spherical aberration, astigmatic field curves, and distortion of the photographing lens system L according to the fourth numerical embodiment.

Fifth Numerical Embodiment

Figure 9:
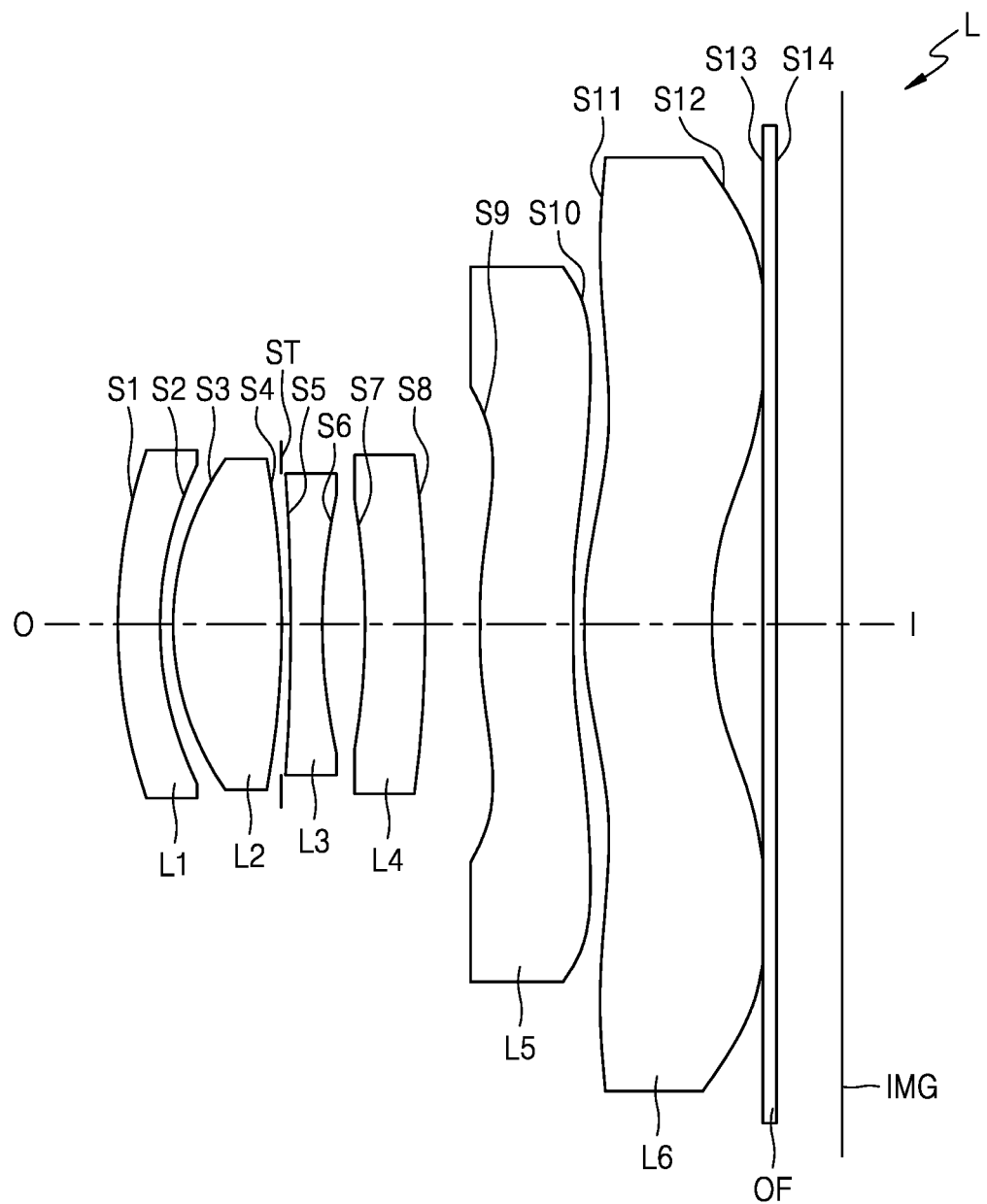
FIG. 9 illustrates a photographing lens system according to a fifth numerical embodiment.

FIG. 9 illustrates a photographing lens system L according to a fifth numerical embodiment, and design data for the photographing lens system L of the fifth numerical embodiment are as follows.

In the fifth numerical embodiment, an effective focal length is 3.93 mm, the focal length f1 of a first lens L1 is −11.655 mm, the focal length f2 of a second lens L2 is 2.285 mm, the focal length f3 of a third lens L3 is −6.434 mm, the focal length f4 of a fourth lens L4 is −58.098 mm, the focal length f5 of a fifth lens L5 is −33.708 mm, and the focal length f6 of a sixth lens L6 is 23.932 mm.

TABLE 9

| Surfaces | Radius of curvature | Lens distance or thickness | Refractive index | Abbe number |
|---|---|---|---|---|
| S1 | 2.579 | 0.320 | 1.544 | 56 |
| S2 | 1.763 | 0.100 | | |
| S3 | 1.446 | 0.804 | 1.544 | 56 |
| S4 | −7.248 | 0.033 | | |
| S5 | −29.623 | 0.260 | 1.65 | 21.5 |
| S6 | 4.757 | 0.307 | | |
| S7 | −20.218 | 0.443 | 1.65 | 21.5 |
| S8 | −25.215 | 0.371 | | |
| S9 | 20.893 | 0.695 | 1.535 | 56 |
| S10 | 4.538 | 0.030 | | |
| S11 | 1.606 | 1.019 | 1.535 | 56 |
| S12 | 1.806 | 0.381 | | |
| S13 | Infinity | 0.110 | 1.517 | 64.1 |
| S14 | Infinity | 0.465 | | |
| IMG | Infinity | 0.002 | | Image Plane |

Table 10 below shows aspheric coefficients in the fifth numerical embodiment.

TABLE 10

| Coefficients | S1 | S2 | S3 | S4 | S5 | S6 | S7 | S8 | S9 | S10 | S11 | S12 |
|---|---|---|---|---|---|---|---|---|---|---|---|---|
| K | −1.31563 | −1.45082 | −0.23638 | 0.00000 | 98.90508 | −53.34272 | 0.00000 | 0.00000 | 0.00000 | 0.00000 | −3.03278 | −3.05317 |
| A | −0.02089 | −0.07989 | −0.08060 | −0.12561 | −0.12241 | 0.03605 | −0.05975 | −0.04025 | 0.08709 | 0.04940 | −0.11638 | −0.06597 |
| B | 0.01547 | 0.05090 | 0.04899 | 0.40410 | 0.49016 | 0.09117 | 0.00140 | −0.03872 | −0.12183 | −0.02902 | 0.06232 | 0.02369 |
| C | −0.05812 | −0.08755 | −0.15154 | −0.89832 | −1.03004 | −0.09409 | 0.12512 | 0.11299 | 0.05048 | 0.00300 | −0.02684 | −0.00757 |
| D | 0.11772 | 0.25641 | 0.41036 | 1.26061 | 1.43688 | 0.01524 | −0.17627 | −0.10853 | 0.01179 | 0.00204 | 0.00724 | 0.00157 |
| E | −0.12220 | −0.33757 | −0.55940 | −1.13276 | −1.33699 | 0.06115 | 0.12275 | 0.07053 | −0.02596 | −0.00098 | −0.00110 | −0.00020 |

In the fifth numerical embodiment, values of Expressions 1 to 6 are as follows:

TTL/DI<0.775;

FOV=79.19°;

TTL/CT=1.566;

$f/f2$=1.72;

$Vd3$=21.5; and $Vd4$=25.9

Figure 10:
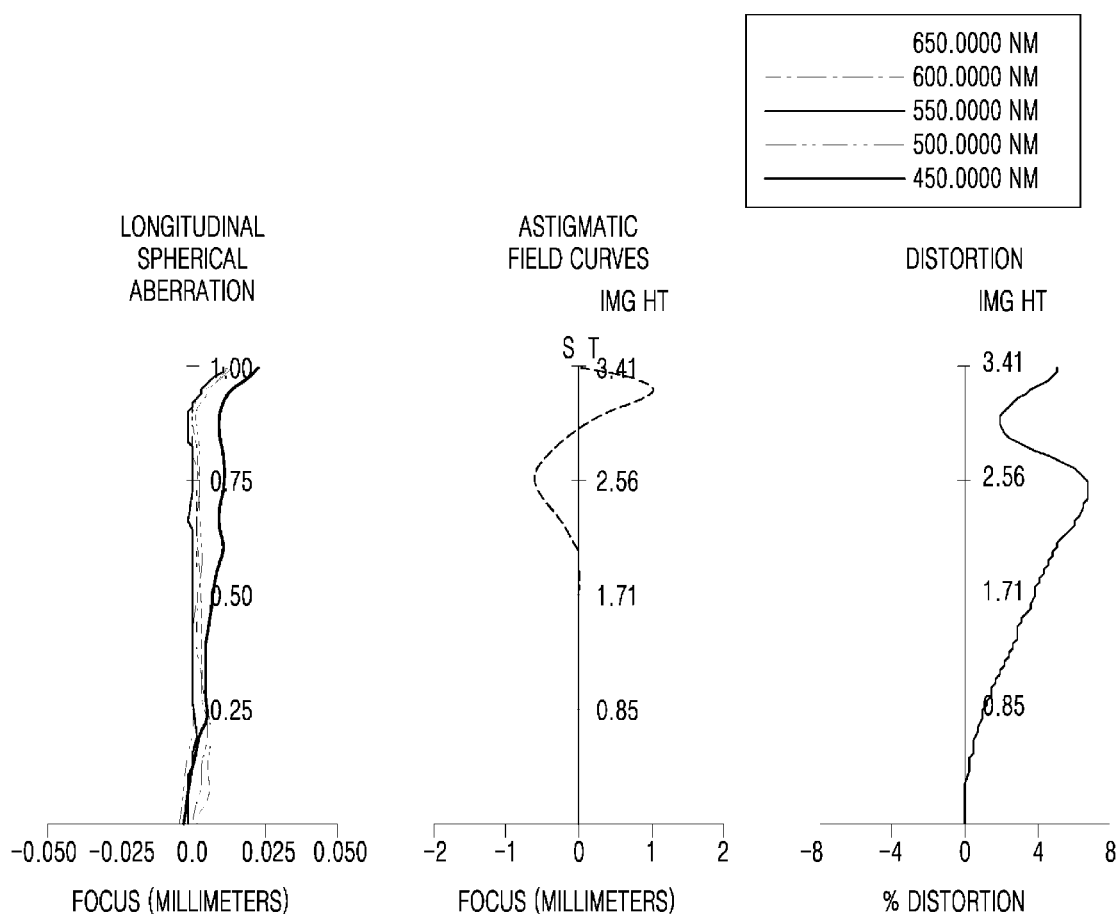
FIG. 10 illustrates aberrations of the photographing lens system according to the fifth numerical embodiment.

FIG. 10 illustrates longitudinal spherical aberration, astigmatic field curves, and distortion of the photographing lens system L according to the fifth numerical embodiment.

Sixth Numerical Embodiment

Figure 11:
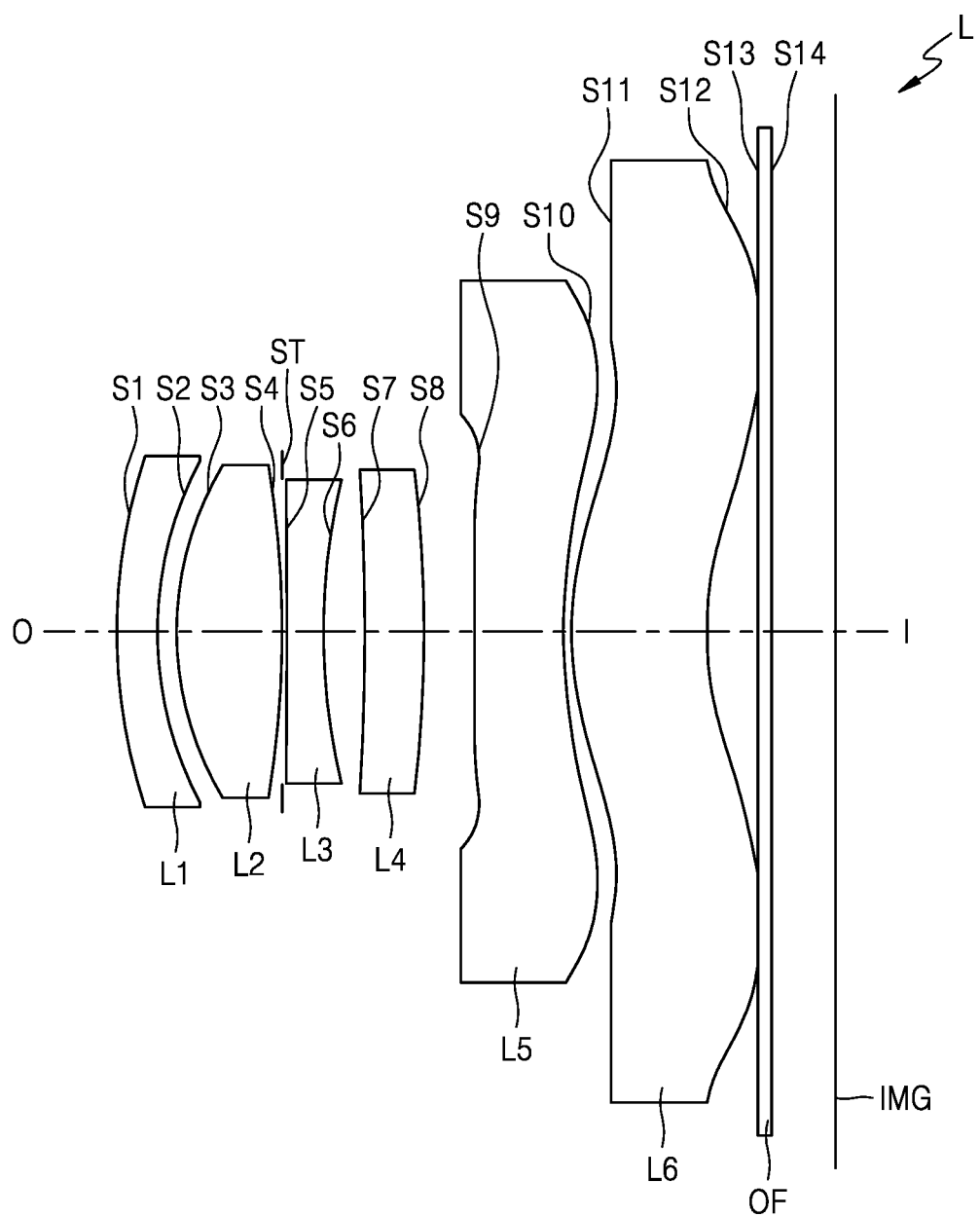
FIG. 11 illustrates a photographing lens system according to a sixth numerical embodiment.

FIG. 11 illustrates a photographing lens system L according to a sixth numerical embodiment, and design data for the photographing lens system L of the sixth numerical embodiment are as follows.

In the sixth numerical embodiment, an effective focal length is 3.926 mm, the focal length f1 of a first lens L1 is −11.842 mm, the focal length f2 of a second lens L2 is 2.281 mm, the focal length f3 of a third lens L3 is −6.224 mm, the focal length f4 of a fourth lens L4 is −161.007 mm, the focal length f5 of a fifth lens L5 is −10.961 mm, and the focal length f6 of a sixth lens L6 is 9.715 mm.

TABLE 11

| Surfaces | Radius of curvature | Lens distance or thickness | Refractive index | Abbe number |
|---|---|---|---|---|
| S1 | −2.579 | 0.320 | 1.544 | 56 |
| S2 | −1.763 | 0.100 | | |
| S3 | −1.446 | 0.804 | 1.544 | 56 |
| S4 | 7.248 | 0.033 | | |
| S5 | −29.623 | 0.260 | 1.65 | 21.5 |

TABLE 11-continued

| Surfaces | Radius of curvature | Lens distance or thickness | Refractive index | Abbe number |
|---|---|---|---|---|
| S6 | 4.757 | 0.307 | | |
| S7 | −20.218 | 0.443 | 1.65 | 21.5 |
| S8 | −25.215 | 0.371 | | |
| S9 | 20.893 | 0.695 | 1.535 | 56 |
| S10 | 4.538 | 0.030 | | |
| S11 | 1.606 | 1.019 | 1.535 | 56 |
| S12 | 1.806 | 0.381 | | |
| S13 | Infinity | 0.110 | 1.517 | 64.1 |
| S14 | Infinity | 0.465 | | |
| IMG | Infinity | 0.002 | | Image Plane |

Table 12 below shows aspheric coefficients in the sixth numerical embodiment.

TABLE 12

| Coefficients | S1 | S2 | S3 | S4 | S5 | S6 | S7 | S8 | S9 | S10 | S11 | S12 |
|---|---|---|---|---|---|---|---|---|---|---|---|---|
| K | −1.34638 | −1.47504 | −0.23981 | 0.00000 | 99.99900 | −51.31943 | 0.00000 | 0.00000 | 0.00000 | 0.00000 | −1.74259 | −1.65943 |
| A | −0.02100 | −0.08024 | −0.08096 | −0.12506 | −0.12295 | 0.03585 | −0.05961 | −0.04270 | 0.08880 | 0.03873 | −0.11944 | −0.07190 |
| B | 0.01595 | 0.05093 | 0.04868 | 0.40444 | 0.48968 | 0.09117 | 0.00354 | −0.04082 | −0.13622 | −0.02948 | 0.06153 | 0.02369 |
| C | −0.05800 | −0.08739 | −0.15162 | −0.89831 | −1.02998 | −0.09405 | 0.12510 | 0.11328 | 0.05460 | 0.00294 | −0.02686 | −0.00751 |
| D | 0.11774 | 0.25650 | 0.41041 | 1.26055 | 1.43712 | 0.01512 | −0.17698 | −0.10835 | 0.01333 | 0.00203 | 0.00724 | 0.00157 |
| E | −0.12219 | −0.33752 | −0.55933 | −1.13278 | −1.33680 | 0.06102 | 0.12302 | 0.07053 | −0.02709 | −0.00098 | −0.00110 | −0.00020 |

In the sixth numerical embodiment, values of Expressions 1 to 6 are as follows:

TTL/DI<0.782;

FOV=79.2°;

TTL/CT=1.508;

$f/f2$=1.721;

$Vd3$=21.5; and $Vd4$=25.9

Figure 12:
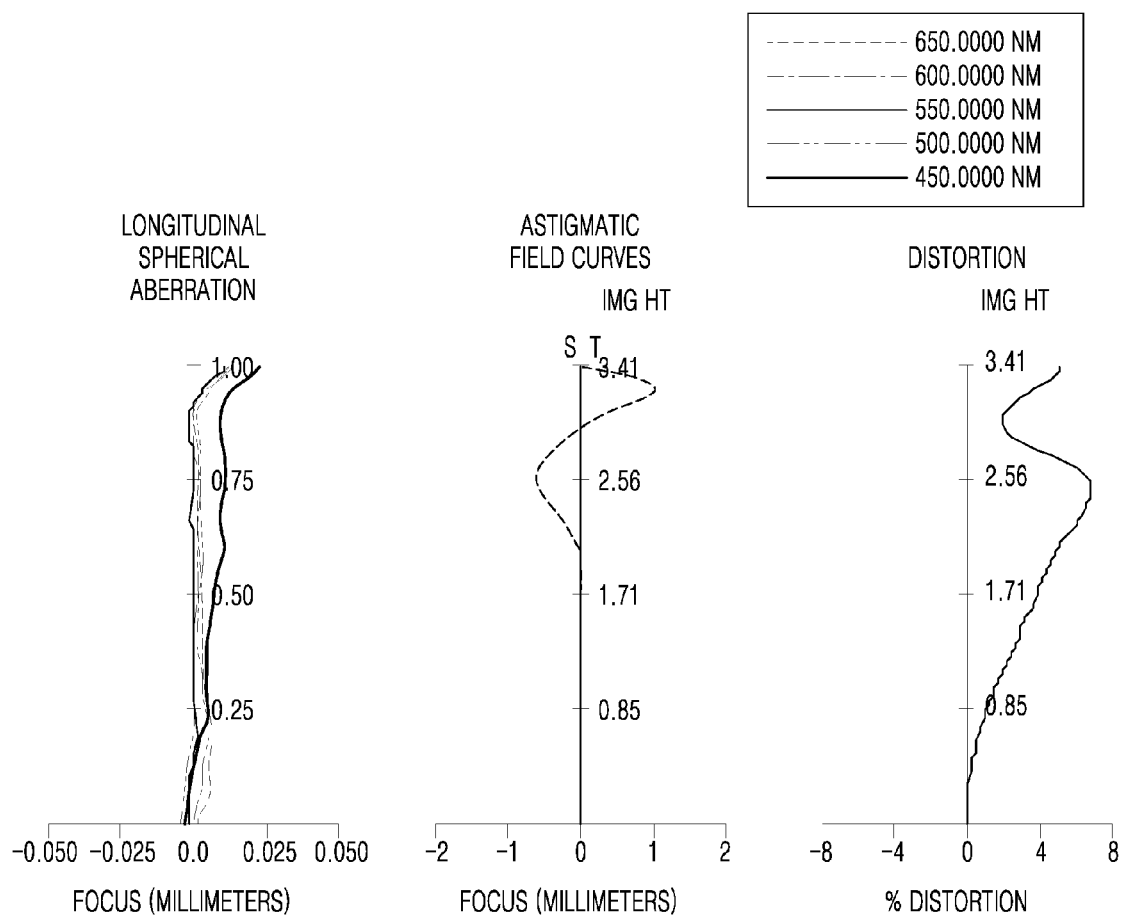
FIG. 12 illustrates aberrations of the photographing lens system according to the sixth numerical embodiment.

FIG. 12 illustrates longitudinal spherical aberration, astigmatic field curves, and distortion of the photographing lens system L according to the sixth numerical embodiment.

Seventh Numerical Embodiment

Figure 13:
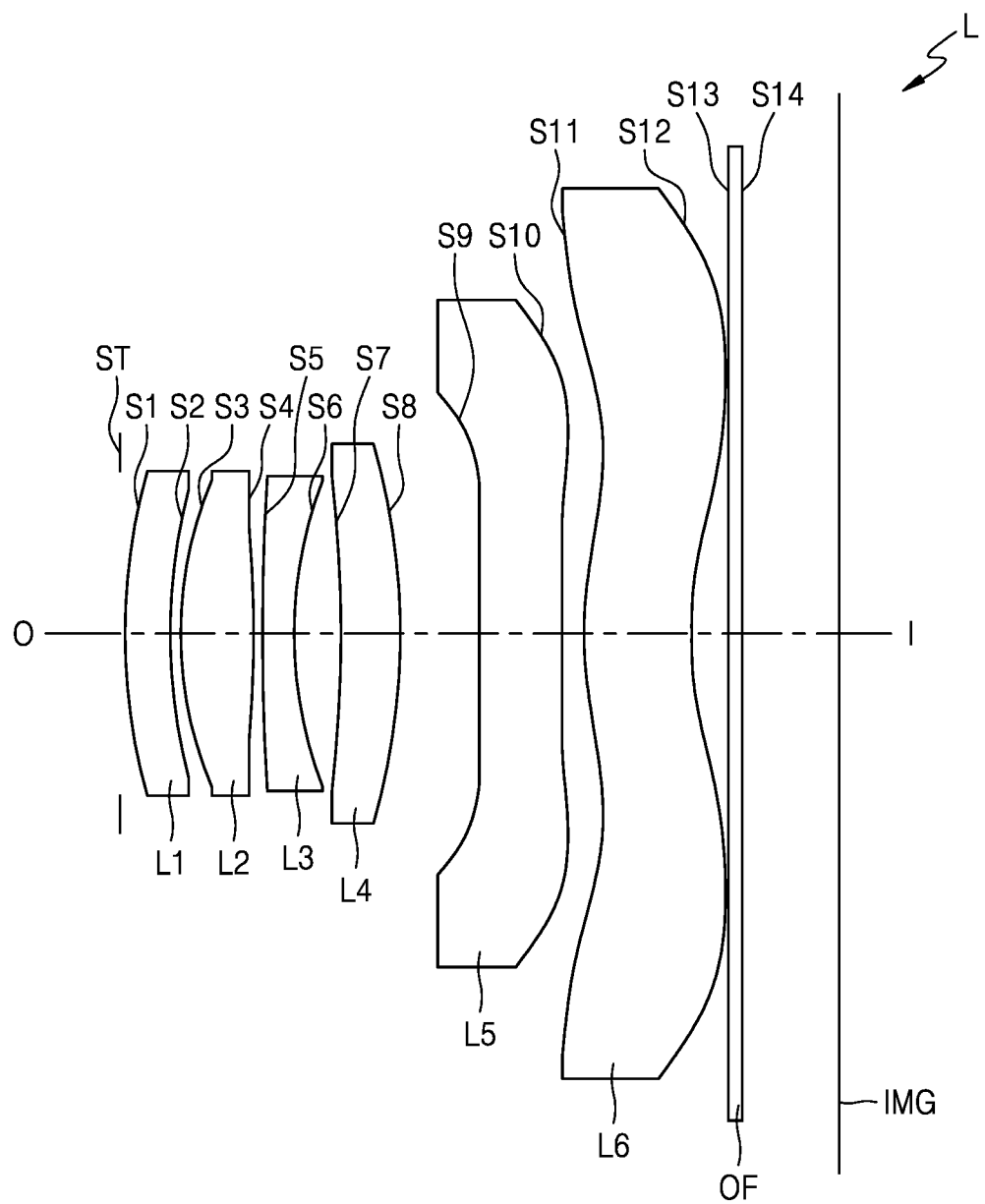
FIG. 13 illustrates a photographing lens system according to a seventh numerical embodiment.

FIG. 13 illustrates a photographing lens system L according to a seventh numerical embodiment, and design data for the photographing lens system L of the seventh numerical embodiment are as follows.

In the seventh numerical embodiment, an effective focal length is 4.191 mm, the focal length f1 of a first lens L1 is −55.871 mm, the focal length f2 of a second lens L2 is 2.689 mm, the focal length f3 of a third lens L3 is −5.248 mm, the focal length f4 of a fourth lens L4 is 14.840 mm, the focal length f5 of a fifth lens L5 is −15.924 mm, and the focal length f6 of a sixth lens L6 is 50.862 mm.

TABLE 13

| Surfaces | Radius of curvature | Lens distance or thickness | Refractive index | Abbe number |
|---|---|---|---|---|
| S1 | −2.135 | 0.328 | 1.544 | 56 |
| S2 | −1.887 | 0.052 | | |
| S3 | −1.771 | 0.570 | 1.544 | 56 |
| S4 | 7.623 | 0.034 | | |
| S5 | 7.656 | 0.26 | 1.642 | 22 |
| S6 | 2.32 | 0.360 | | |
| S7 | −16.207 | 0.408 | 1.640 | 23 |
| S8 | −6.079 | 0.598 | | |
| S9 | −69.000 | 0.609 | 1.642 | 22 |
| S10 | 12.166 | 0.172 | | |
| S11 | 2.205 | 0.773 | 1.535 | 56 |
| S12 | 2.105 | 0.284 | | |
| S13 | Infinity | 0.11 | 1.517 | 64.1 |
| S14 | Infinity | 0.596 | | |
| IMG | Infinity | 0.099 | | |

Table 14 below shows aspheric coefficients in the seventh numerical embodiment.

TABLE 14

| Coefficients | S1 | S2 | S3 | S4 | S5 | S6 |
|---|---|---|---|---|---|---|
| K | −2.61348 | −6.13457 | −2.22540 | −173.56965 | 51.20928 | −14.70912 |
| A | −0.03018 | −0.10370 | −0.08830 | −0.10276 | −0.16099 | 0.02939 |
| B | 0.01346 | 0.03769 | 0.09739 | 0.40816 | 0.49521 | 0.08058 |
| C) | −0.08295 | −0.08595 | −0.14946 | −0.94767 | −1.10409 | −0.10696 |
| D | 0.12677 | 0.27418 | 0.43656 | 1.34668 | 1.54938 | 0.03067 |
| E | −0.12504 | −0.37204 | −0.61395 | −1.22981 | −1.45849 | 0.07285 |

| Coefficients | S7 | S8 | S9 | S10 | S11 | S12 |
|---|---|---|---|---|---|---|
| K | 6.31667 | 13.39985 | 2.36181 | 29.10749 | −4.81153 | −3.82585 |
| A | −0.05880 | −0.03250 | 0.04227 | 0.00388 | −0.13375 | −0.06807 |
| B | −0.03154 | −0.04498 | −0.09628 | −0.01966 | 0.06774 | 0.02674 |
| C) | 0.15116 | 0.11658 | 0.05869 | 0.00172 | −0.02843 | −0.00832 |

TABLE 14-continued

| | | | | | | |
|---|---|---|---|---|---|---|
| D | −0.21251 | −0.12088 | −0.02297 | 0.00230 | 0.00777 | 0.00168 |
| E | 0.15383 | 0.08342 | 0.00483 | −0.00106 | −0.00120 | −0.00022 |

In the seventh numerical embodiment, values of Expressions 1 to 6 are as follows:

Table 16 below shows aspheric coefficients in the eighth numerical embodiment.

TABLE 16

| Coefficients | S1 | S2 | S3 | S4 | S5 | S6 | S7 | S8 | S9 | S10 | S11 | S12 |
|---|---|---|---|---|---|---|---|---|---|---|---|---|
| K | −2.68851 | −6.00498 | −2.26585 | 0.00000 | 51.10229 | −13.93871 | 6.31667 | 13.39985 | 2.36181 | 28.48907 | −5.10437 | −3.10155 |
| A | −0.03070 | −0.10324 | −0.08878 | −0.10244 | −0.16152 | 0.03056 | −0.05990 | −0.03134 | 0.03954 | 0.00471 | −0.13352 | −0.06911 |
| B | 0.01323 | 0.03790 | 0.09716 | 0.40833 | 0.49491 | 0.08135 | −0.03222 | −0.04450 | −0.09418 | −0.01985 | 0.06771 | 0.02667 |
| C | −0.08307 | −0.08583 | −0.14958 | −0.94757 | −1.10428 | −0.10634 | 0.15087 | 0.11618 | 0.06046 | 0.00174 | −0.02842 | −0.00832 |
| D | 0.12669 | 0.27425 | 0.43649 | 1.34674 | 1.54924 | 0.03124 | −0.21231 | −0.12134 | −0.02275 | 0.00231 | 0.00777 | 0.00168 |
| E | −0.12508 | −0.37200 | −0.61400 | −1.22978 | −1.45859 | 0.07336 | 0.15439 | 0.08332 | 0.00490 | −0.00106 | −0.00120 | −0.00022 |

TTL/DI<0.769;

FOV=76.7°;

TTL/CT=1.782;

$f/f2$=1.559;

$Vd3$=22.0; and $Vd4$=23.0

Figure 14:
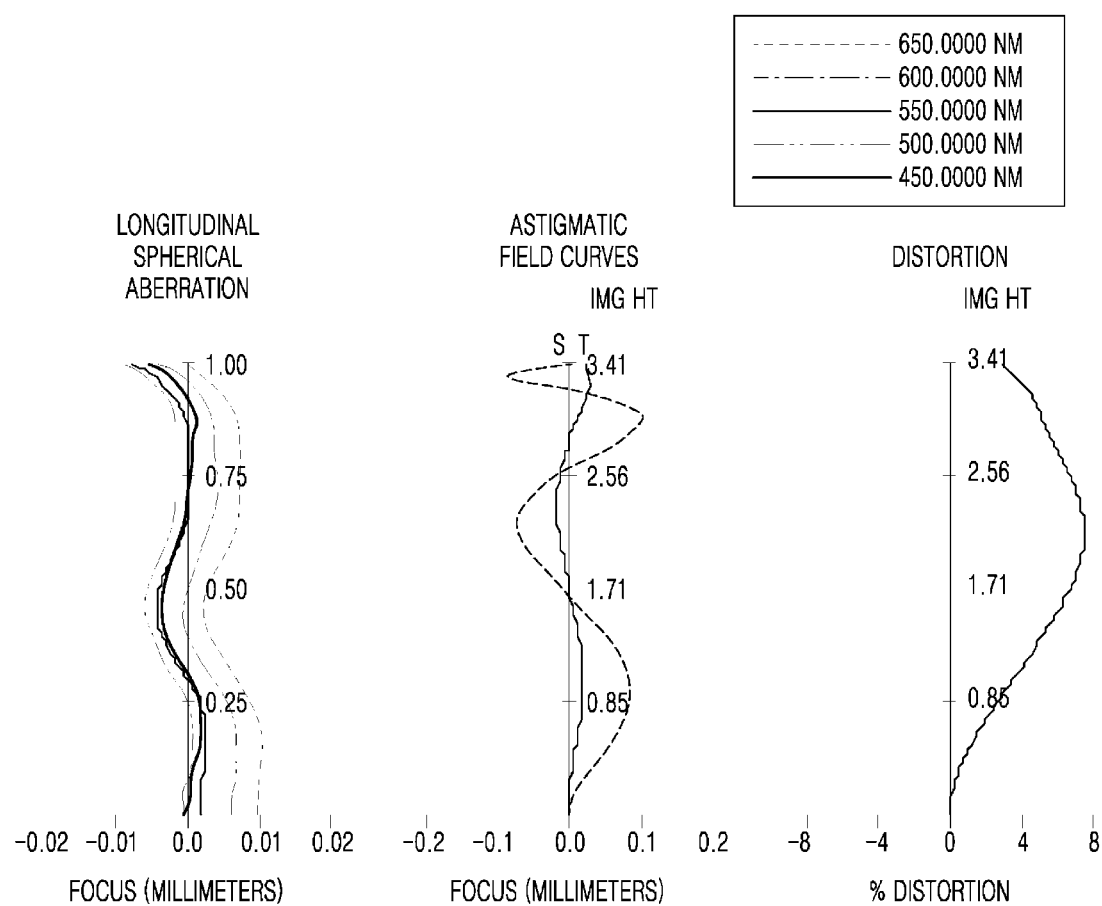
FIG. 14 illustrates aberrations of the photographing lens system according to the seventh numerical embodiment.

FIG. 14 illustrates longitudinal spherical aberration, astigmatic field curves, and distortion of the photographing lens system L according to the seventh numerical embodiment.

Eighth Numerical Embodiment

Figure 15:
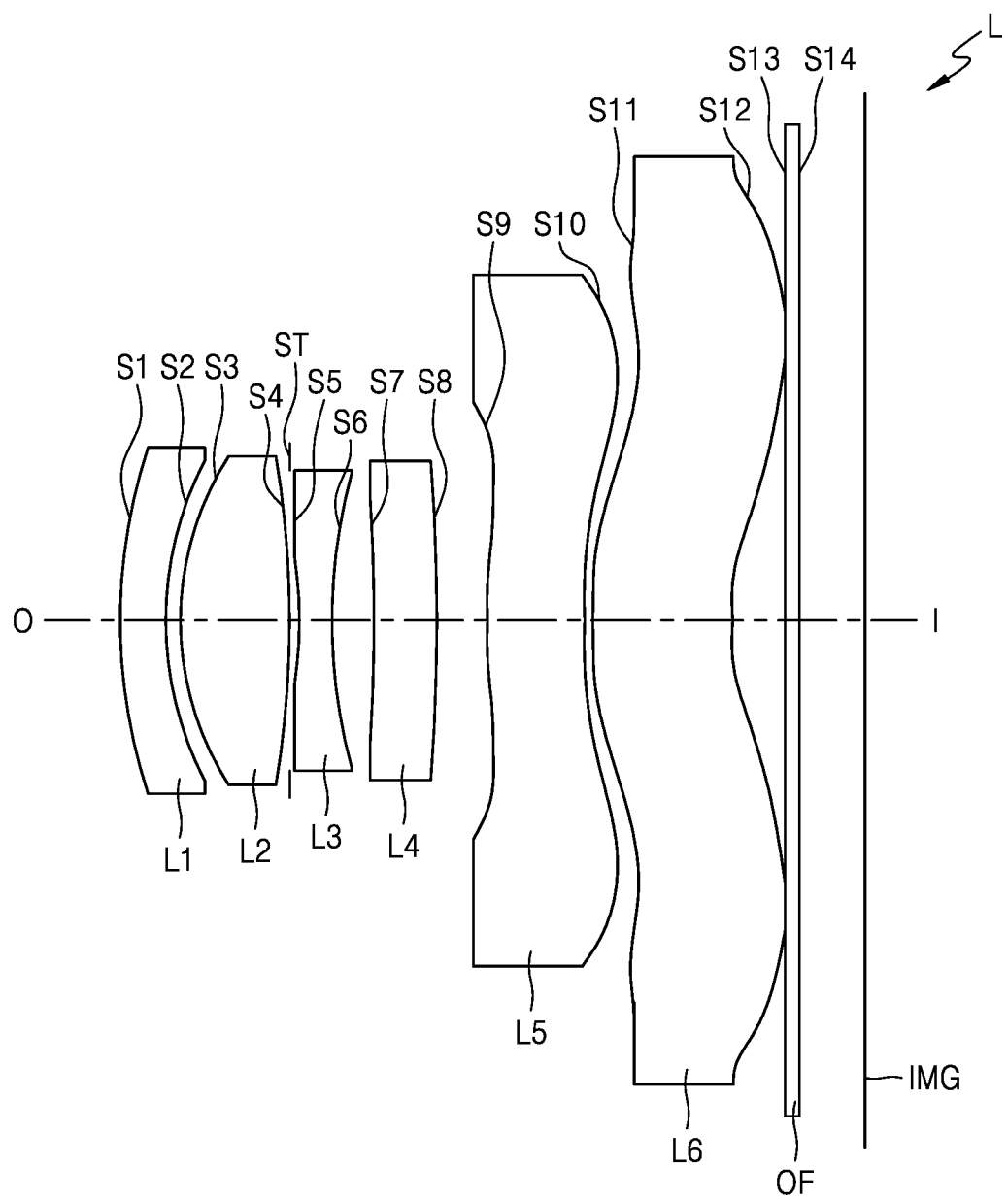
FIG. 15 illustrates a photographing lens system according to an eighth numerical embodiment.

FIG. 15 illustrates a photographing lens system L according to an eighth numerical embodiment, and design data for the photographing lens system L of the eighth numerical embodiment are as follows.

In the eighth numerical embodiment, an effective focal length is 4.173 mm, the focal length f1 of a first lens L1 is −66.186 mm, the focal length f2 of a second lens L2 is 2.722 mm, the focal length f3 of a third lens L3 is −5.303 mm, the focal length f4 of a fourth lens L4 is 15.272 mm, the focal length f5 of a fifth lens L5 is −16.214 mm, and the focal length f6 of a sixth lens L6 is 26.483 mm.

TABLE 15

| Surfaces | Radius of curvature | Lens distance or thickness | Refractive index | Abbe number |
|---|---|---|---|---|
| S1 | −2.285 | 0.336 | 1.544 | 56 |
| S2 | −2.037 | 0.062 | | |
| S3 | −1.801 | 0.577 | 1.544 | 56 |
| S4 | 7.559 | 0.019 | | |
| S5 | 7.671 | 0.279 | 1.642 | 22 |
| S6 | 2.338 | 0.428 | | |
| S7 | −16.626 | 0.591 | 1.640 | 23 |
| S8 | −6.274 | 0.482 | | |
| S9 | −72.363 | 0.534 | 1.642 | 22 |
| S10 | 12.318 | 0.128 | | |
| S11 | 2.187 | 0.712 | 1.535 | 56 |
| S12 | 2.290 | 0.286 | | |
| S13 | Infinity | 0.110 | 1.517 | 64.1 |
| S14 | Infinity | 0.888 | | |
| IMG | Infinity | −0.020 | | |

In the eighth numerical embodiment, values of Expressions 1 to 6 are as follows:

TTL/DI<0.777;

FOV=77.9°;

TTL/CT=1.751;

$f/f2$=1.533;

$Vd3$=22.0; and $Vd4$=23.0

Figure 16:
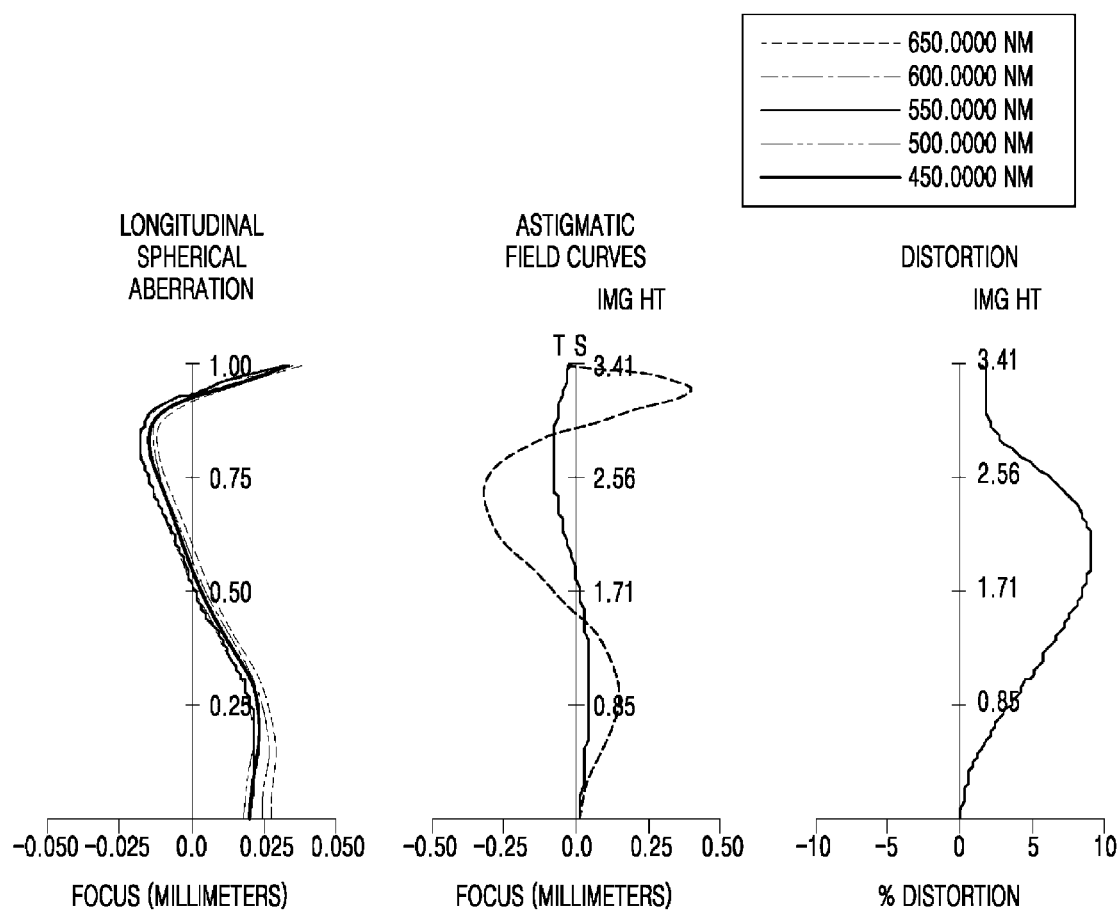
FIG. 16 illustrates aberrations of the photographing lens system according to the eighth numerical embodiment.

FIG. 16 illustrates longitudinal spherical aberration, astigmatic field curves, and distortion of the photographing lens system L according to the eighth numerical embodiment.

The photographing lens systems L of the embodiments may have low F numbers and may be used to take bright pictures under poor illumination.

The photographing lens systems L of the embodiments may be used in photographing apparatuses employing image sensors. The photographing lens systems L of the embodiments may be applied to various photographing apparatuses such as digital cameras, interchangeable lens cameras, video cameras, cellular phone cameras, or cameras of small mobile devices.

Figure 17:
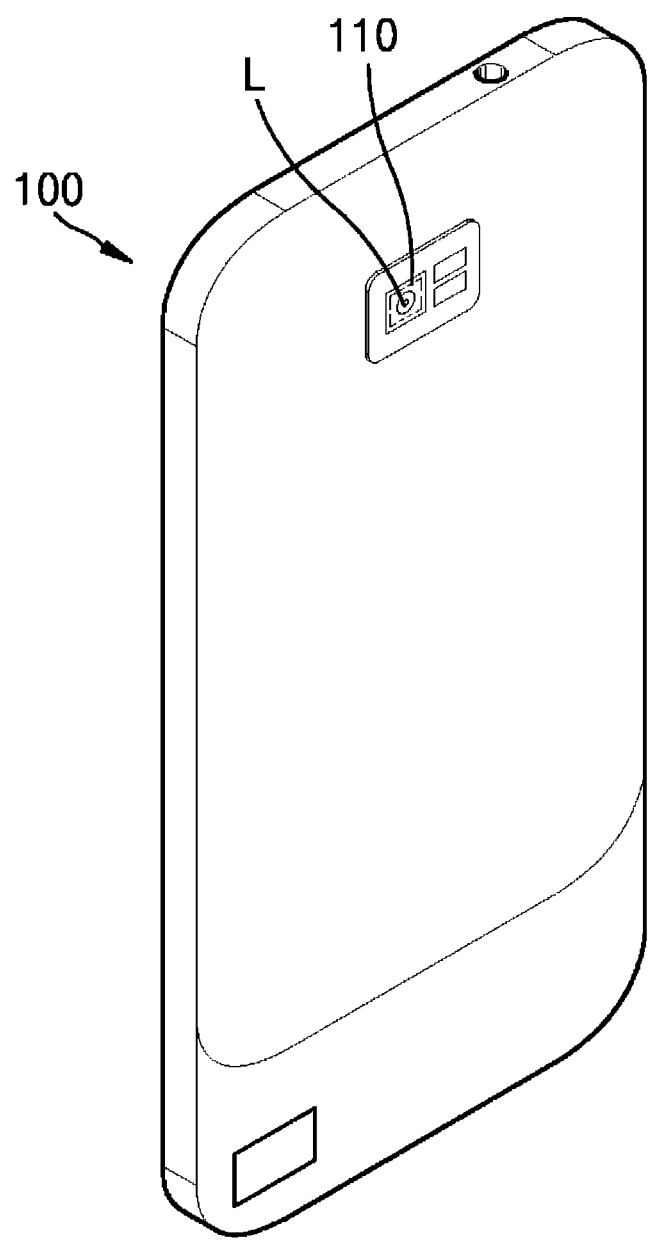
FIG. 17 is a perspective view a photographing apparatus including a photographing lens system according to an embodiment.

FIG. 17 illustrates a photographing apparatus 100 including a photographing lens system L according to an embodiment. FIG. 17 illustrates a non-limiting example in which the photographing apparatus 100 is applied to a mobile phone.

The photographing apparatus 100 may include: the photographing lens system L; and an image sensor 110 configured to convert images formed by the photographing lens system L into electric image signals. The photographing lens system L may be any one of the photographing lens systems L described with reference to FIGS. 1 to 16. If the photographing lens systems L of the embodiments are used in photographing apparatuses such as small digital cameras or mobile phones, the photographing apparatuses may have wide fields of view and high photographing performance.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A photographing lens system comprising:
   a first lens having a negative refractive power;
   a second lens comprising an object-side surface convex toward an object side, the second lens having a positive refractive power;
   a third lens comprising an image-side surface concave toward an image side, the third lens having a negative refractive power;
   a fourth lens having a negative or positive refractive power;
   a fifth lens having a negative refractive power; and
   a sixth lens comprising an image-side surface concave toward the image side, the sixth lens having a negative or positive refractive power,
   wherein the first to sixth lenses are sequentially arranged in a direction from the object side to the image side, and
   wherein the photographing lens system satisfies the following expressions:

$Vd3<30$; and $Vd4<30$, wherein Vd3 refers to an Abbe number of the third lens, and Vd4 refers to an Abbe number of the fourth lens.

2. The photographing lens system of claim 1, wherein the photographing lens system satisfies the following expression:

$0.65<TTL/DI<0.8$, wherein TTL is a distance from an object-side surface of the first lens to an image sensor, and DI refers to a diagonal length of the image sensor.

3. The photographing lens system of claim 1, wherein the photographing lens system satisfies the following expression:

$70°<FOV<80°$, wherein FOV is a field of view.

4. The photographing lens system of claim 1, wherein the photographing lens system satisfies the following expression:

$1.2<TTL/CT<1.8$, wherein TTL refers to a distance from an object-side surface of the first lens to an image sensor, and CT refers to a sum of center thicknesses of the first to sixth lenses measured along an optical axis.

5. The photographing lens system of claim 1, wherein the photographing lens system satisfies the following expression:

$1.4<f/f2<1.8$, wherein f denotes a focal length of the photographing lens system, and f2 denotes a focal length of the second lens.

6. The photographing lens system of claim 1, wherein refractive index of the third lens and the refractive index of the fourth lens are equal to or greater than 1.64.

7. The photographing lens system of claim 1, further comprising at least one aperture stop disposed between an object-side surface of the first lens and the third lens.

8. The photographing lens system of claim 1, wherein each of the first to sixth lenses comprises at least one aspheric surface.

9. The photographing lens system of claim 1, wherein each of the first to sixth lenses comprises a plastic lens.

10. The photographing lens system of claim 1, wherein the image-side surface of the sixth lens has at least one inflection point.

11. The photographing lens system of claim 1, wherein the first lens has a meniscus shape convex toward the object side.

12. A photographing lens system comprising:
    a first lens having a negative refractive power;
    a second lens having a positive refractive power;
    a third lens having a negative refractive power;
    a fourth lens having a negative or positive refractive power;
    a fifth lens having a negative refractive power; and
    a sixth lens having a negative or positive refractive power, wherein at least one of an object-side surface and an image-side surface of the sixth lens has at least one inflection point,
    wherein the first to sixth lenses are sequentially arranged in a direction from an object side to an image side, and the photographing lens system satisfies the following expression:

$1.4<f/f2<1.8$, wherein f denotes a focal length of the photographing lens system, and f2 denotes a focal length of the second lens, and
    wherein the photographing lens system satisfies the following expressions:

$Vd3<30$;

$Vd4<30$; and $0.65<TTL/DI<0.8$, wherein Vd3 refers to an Abbe number of the third lens, Vd4 refers to an Abbe number of the fourth lens, TTL refers to a distance from an object-side surface of the first lens to an image sensor, and DI is a diagonal length of the image sensor.

13. The photographing lens system of claim 12, wherein the photographing lens system satisfies the following expression:

$70°<FOV<80°$, wherein FOV is a field of view.

14. The photographing lens system of claim 12, wherein the photographing lens system satisfies the following expression:

$1.2<TTL/CT<1.8$, wherein TTL is a distance from an object-side surface of the first lens to an image sensor, and CT is a sum of center thicknesses of the first to sixth lenses measured along an optical axis.

15. The photographing lens system of claim 12, wherein refractive index of the third lens and the refractive index of the fourth lens are equal to or greater than 1.64.

16. The photographing lens system of claim 12, further comprising at least one aperture stop disposed between an object-side surface of the first lens and the third lens.

17. The photographing lens system of claim 12, wherein each of the first to sixth lenses comprises at least one aspheric surface.

18. The photographing lens system of claim 12, wherein each of the first to sixth lenses comprises a plastic lens.

19. The photographing lens system of claim 12, wherein an image-side surface of the sixth lens has at least one inflection point.

20. A photographing apparatus comprising:
a photographing lens system; and
an image sensor configured to receive an image formed by the photographing lens system and convert the image into an electric image signal,
wherein the photographing lens system comprises:
  a first lens having a negative refractive power;
  a second lens comprising an object-side surface convex toward an object side, the second lens having a positive refractive power;
  a third lens comprising an image-side surface concave toward an image side, the third lens having a negative refractive power;
  a fourth lens having a negative or positive refractive power;
  a fifth lens having a negative refractive power; and
  a sixth lens comprising an image-side surface concave toward the image side, the sixth lens having a negative or positive refractive power,
wherein the first to sixth lenses are sequentially arranged in a direction from the object side to the image side, and
wherein the photographing lens system satisfies the following expressions:

$Vd3<30$; and $Vd4<30$, wherein Vd3 refers to an Abbe number of the third lens, and Vd4 refers to an Abbe number of the fourth lens.

* * * * *